(12) United States Patent
Takahashi et al.

(10) Patent No.: US 8,411,233 B2
(45) Date of Patent: Apr. 2, 2013

(54) METHOD FOR MANUFACTURING A COLOR FILTER SUBSTRATE

(75) Inventors: Sounosuke Takahashi, Kanagawa (JP); Teruaki Suzuki, Kanagawa (JP); Shinichi Nishida, Kanagawa (JP); Yoshikazu Sakaguchi, Kanagawa (JP); Yoichi Sasaki, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 13/586,102

(22) Filed: Aug. 15, 2012

(65) Prior Publication Data

US 2012/0309120 A1   Dec. 6, 2012

Related U.S. Application Data

(62) Division of application No. 12/344,679, filed on Dec. 29, 2008, now Pat. No. 8,269,924.

(30) Foreign Application Priority Data

Dec. 26, 2007 (JP) .................................. 2007-334501
Oct. 22, 2008 (JP) .................................. 2008-272401

(51) Int. Cl.
*G02F 1/1335* (2006.01)
(52) U.S. Cl. .............................................. 349/106
(58) Field of Classification Search ................... None
See application file for complete search history.

(56) References Cited

U.S. PATENT DOCUMENTS

| | | | |
|---|---|---|---|
| 5,757,452 | A | 5/1998 | Masaki et al. |
| 6,469,758 | B2 | 10/2002 | Yu |
| 7,952,659 | B2 | 5/2011 | Takahashi et al. |
| 2007/0216832 | A1* | 9/2007 | Takahashi et al. ............ 349/106 |
| 2010/0002172 | A1 | 1/2010 | Kim et al. |
| 2011/0199698 | A1 | 8/2011 | Takahashi et al. |

FOREIGN PATENT DOCUMENTS

| | | |
|---|---|---|
| CN | 1503012 | 6/2004 |
| CN | 101042445 | 9/2007 |
| JP | 59-204009 | 11/1984 |
| JP | 61-105583 | 5/1986 |
| JP | 08-095021 | 4/1996 |
| JP | 2590858 | 12/1996 |
| JP | 2000-029014 | 1/2000 |
| JP | 2000-089240 | 3/2000 |
| JP | 2003-014917 | 1/2003 |
| JP | 2004-062145 | 2/2004 |

OTHER PUBLICATIONS

Isamu Washizuka, IDW'97 Digest, 227 (1997) ALC5-4.
Notification of First Office Action issued Oct. 26, 2011 by the State Intellectual Property Office of the People's Republic of China in Chinese Application No. 200810190232.2 with English Translation, 19 pages.

* cited by examiner

*Primary Examiner* — Lucy Chien
(74) *Attorney, Agent, or Firm* — Young & Thompson

(57) ABSTRACT

A light shield member in a LCD unit includes a first shield section that includes a pile of two color filter patterns and separates each effective opening of pixel from an effective opening of the adjacent pixel, and a second shield section that includes a pile of three color filter patterns and shields a TFT area including a TFT and the vicinity thereof.

6 Claims, 31 Drawing Sheets

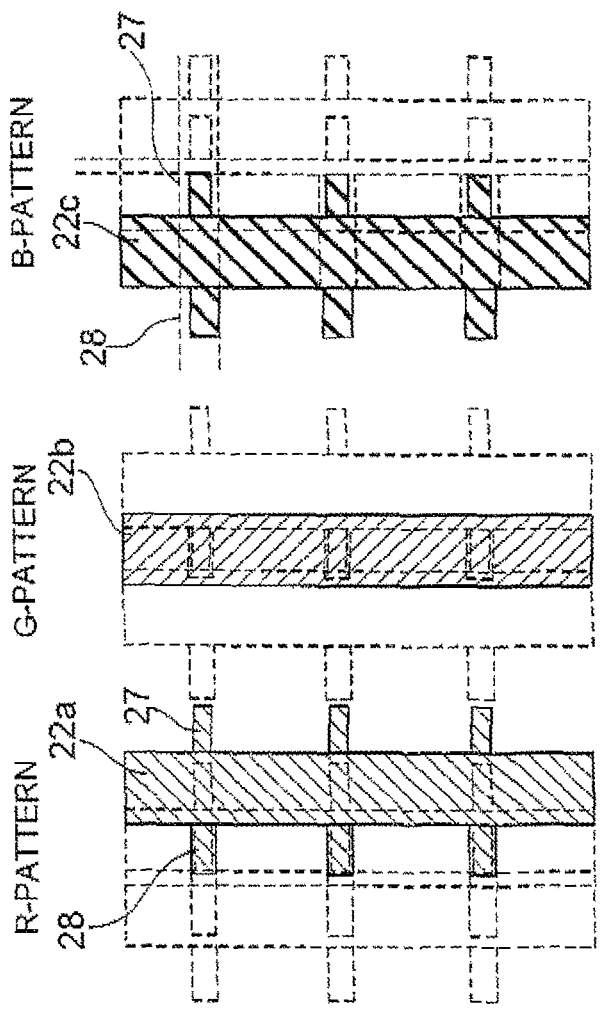

METHOD FOR MANUFACTURING A COLOR FILTER SUBSTRATE

CROSS REFERENCE TO RELATED APPLICATIONS

This application is a division of application Ser. No. 12/344,679 filed on Dec. 29, 2008, which claims the benefit of priority from Japanese patent applications No. 2007-334501 filed on Dec. 26, 2007 and No. 2008-272401 filed on Oct. 22, 2008, the disclosure of which is incorporated herein in its entirety by reference.

TECHNICAL FIELD

The present invention relates to a color filter (CF) substrate and a liquid crystal display (LCD) unit including the CF substrate. The present invention also relates to a method for manufacturing the CF substrate.

BACKGROUND ART

In the CF substrate used in a conventional LCD unit, a black matrix member formed from a resin or metallic film is used to shield the area of the LCD unit other than the effective opening area of each pixel against incident light. In some of a variety of applications of the CF substrate, such as for a smaller-sized LCD unit provided in a portable phone, that require relatively less higher image quality, the shield function is achieved by using a pile of adjacent two color filter layers without using the black matrix member. The absence of black matrix member saves the materials, number of process steps and thus costs of the CF substrate.

A technique of using three color filter layers in other applications of the CF substrate that require a higher image quality is known in the art to reduce the materials, number of process steps and costs without degrading the image quality (refer to Patent Publications-1 and -3). This technique also provides the merit of a higher light shield performance, which achieves a higher optical density (OD value).

Patent Publication-2 describes an example of forming a light shield member by using a half-tone mask. This configuration allows reduction of the thickness of the color filter layers and thus provides the advantage that the step difference caused by using a pile three color filter layers is reduced. Patent Publication-2 also describes a technique of patterning three color filter layers by using a common mask.

Patent Publication-4 describes a technique of using a pile of two color filter layers on the peripheral area outside the effective display area. This configuration provides the advantage that the step difference is reduced as compared to the case of using a pile of three color filter layers.

One of Patent Publications-1, 4 and 5 describes a technique wherein the lattice-shaped black matrix member is not disposed in the display area other than the peripheral area, or a single color filter pattern or a pile of adjacent two color filter patterns is disposed to shield the drain lines (signal lines). In this configuration, even if the single mask is used for shielding, the problem of reduction of optical density is solved so long as the LCD unit is of a normally-black mode and a perpendicular orientation mode of the LC layer.

Patent Publication-6 describes a configuration wherein color filter to layers covering RGB pixels are formed from four color filter layers, i.e., R-, Ye-, Cy- and B-color filter layers, a shield member for shielding the TFT is configured by a pile of three color filter layers, and the black matrix member for shielding the other area is configured by a pile of red- and blue-color filter layers. In this configuration, there is the advantage that a higher shield function is assured for the TFT area including a TFT and the vicinity thereof.

FIGS. 21A to 21D and FIG. 22 show the structure of the CF substrate described in Patent Publication-3, wherein FIGS. 21A to 21D show a top plan view of color filter layers on the CF substrate in consecutive steps of fabrication thereof, and FIG. 22 is a sectional view taken along line H-H' in FIG. 21C. FIG. 21A shows the step of depositing a red-color filter layer 22a on a transparent substrate 40, FIG. 21B shows the step of depositing a blue-color filter layer 22b thereon, FIG. 21C shows the step of depositing a green-color filter layer 22c thereon, and FIG. 21D shows the step forming columnar spacers 31. After forming the color filter layers 22a, 22b, 22c, an overcoat film (not shown) is formed thereon depending on the type of the LCD unit, and columnar spacers 31 are formed to secure a cell gap of the LC panel which is obtained by bonding the CF substrate to a THT substrate not shown. The cell gap of the LC panel is around 3.0 to 4.0 μm. Before bonding the CF substrate to the TFT substrate, an orientation processing is performed onto the surface of both the CF substrate and TFT substrate. After the bonding or before the bonding, liquid crystal (LC) is provided in the cell gap, and a pair of polarizing films are attached onto both the outer surfaces of the LC panel.

The TFT substrate may be of an in-plane switching mode (IPS). Patent Publications-5 and 7 describe an IPS-mode LCD unit wherein drain bus lines and gate bus lines are covered by an overlying common electrode with an intervention of an interlevel dielectric film.

FIGS. 23 and 24, which correspond to FIGS. 1 and 2, respectively, in Patent Publication-5, show the IPS-mode LCD unit. FIG. 23 is a top plan view of a TFT substrate 10 in the LCD unit, whereas FIG. 24 is a sectional view of the LC panel including a LC layer 30 sandwiched between the TFT substrate 10 and a CF substrate 20. In FIG. 23, a plurality of gate lines (scan lines) 41 and a plurality of common electrode lines 42 extend in the same row direction, whereas a plurality of drain lines 43 extend in the column direction on the gate insulation film which overlies the gate lines 41 and common electrode lines 42. In the vicinity of each of the intersections of the gate lines and drain lines on the TFT substrate 10, there is provided a TFT 45 having an amorphous channel layer, as understood from FIG. 24. The TFT 45 includes a source electrode 14b connected to a comb-shaped pixel electrode 44, the other end of which is connected to a storage capacitor that is configured by the pixel electrode 44, common electrode line 42 and the interlevel dielectric film disposed therebetween. Overlying the above structure, to there is provided a common electrode 46 made of a transparent metal that overlies the drain lines 43 and gate lines 41. The common electrode 46 is connected to the underlying common electrode lines 42 via a contact hole penetrating the overcoat film and gate insulation film. In FIG. 23, sign "L" denotes the direction of rubbing treatment of the orientation film.

FIG. 25, which corresponds to FIG. 21 in Patent Publication-5, is an enlarged top plan view depicting the vicinity of the gate lines 41 in the LCD unit shown in FIG. 23. In FIG. 25, the gate lines 41 underlie the common electrode 46, which overlaps the gate lines 41 as well as the common electrode line 42. The common electrode 46 also overlies a gap between each of the source electrode and storage capacitor and the gate electrode line 41, as well as the vicinity of the electrodes that are disposed adjacent to the gate lines 41.

As shown in FIGS. 23 and 24, a black-matrix member (film) 47, which is shown as encircled by a dotted line in FIG. 23 and formed on the CF substrate 20, overlies and shields the area around the TFT 45. In this configuration, the black-matrix member 47 has roughly a minimum size that prevents incident of light onto the TFT 145. It is to be noted that the black-matrix member 47 does not overlie the gate lines 41 and drain lines 43, and has a shape of isolated pattern overlying the TFT 45.

The configuration shown in FIGS. 23, 24 and 25 is such that the electric field generated in the vicinity of the gate lines 41 is shielded by the overlying common electrode 46, and thus the orientation of LC molecules in this area of the LC layer 30 is not changed from the initial orientation, whereby leakage light from the backlight source is not generated therein. This allows the black-matrix member 47 to have the above minimum size, as shown in FIG. 23, because the CF substrate 20 need not have a light shield function.

The publications described in this text include:
Patent Publication-1 (JP-2590858B);
Patent Publication-2 (JP-1996-95021A);
Patent Publication-3 (JP-2003-14917A);
Patent Publication-4 (JP-2000-29014A);
Patent Publication-5 (JP-2004-62145A);
Patent Publication-6 (JP-61-105583A);
Patent Publication-7 (JP-2000-89240A); and
Non-patent literature-1 (I. Washizuka, IDW'97 DIGEST, 227 (1997) ALC5-4).

The technique of using a pile of three color filter layers, as described in Patent Publications-1, -3 and -5, involves the problem as discussed hereinafter.

The color reproducibility of a LCD unit, which depends on the use thereof, is around tens of percents with the upper limit thereof around 60% in the case of industrial use, such as some notebook personal computers, that does not require an NTSC ratio of 72% or above in the sRGB or an EBU standard. For example, in the combination of a color filter having an NTSC ratio of around 40% and using a photosensitive resist obtained by a typical pigment dispersion technique and a backlight including a cold cathode fluorescent lamp (CCFL), the thickness of the RGB color filter layers is around 1.0 μm. In this case, if all the shield patterns formed on the TFTs, drain lines and gate lines, i.e., all the black matrix members formed on the CF substrate are to be replaced by a pile of three color filter layers, the step difference formed between the film thickness of the effective opening area covered by a single color layer and the film thickness of the light shield member configured by the pile of three color filter layers is as large as 2.0 μm at a maximum in the vicinity of the periphery of the display area. In the case of a CF substrate of a TN (twisted nematic)-mode LCD unit, transparent electrodes of ITO (indium tin oxide) etc., which are formed on the surface of the color layer, have substantially no leveling function to solve the problem of large step difference. The overcoat film, which is typically formed on the CF substrate of an IPS- or VA (vertical alignment)-mode LCD unit, has an insufficient leveling function.

For example, assuming that the overcoat film has a thickness of 1.0 μm, only 60% to 70% of the step difference can be removed by a leveling treatment, to thereby leave a step difference of around 1.4 μm. Thus, the structure of a pile of three black-matrix members leaves a large step difference having a lattice shape in the entire display area, whereby an insufficient injection of LC or insufficient orientation caused by malfunction of the rubbing treatment, if any, will degrade the image quality of the resultant LCD unit.

The pile of three color filter layers described in Patent Publication-2 involves the problem as discussed hereinafter. The shield pattern of a pile of three color filter layers formed by the half-tone masks causes a smaller thickness of each color filter layer due to the small thickness of the half-tone masks to thereby cause a smaller optical density, and thus cannot provide a desired light shield function.

The structure of the shield section formed by a pile of two color filter layers, which are disposed adjacent to each other, among the RGB primary color filter layers, such as described in Patent Publications-3, 4 and 5 and Non-patent literature-1, involves the problem as discussed hereinafter.

If the lattice-shaped black-matrix member is not disposed in the effective display area of the LCD unit other than the peripheral area, or if a single color filter layer or two adjacent color filter layers overlapped together is provided for shielding the width of the drain lines in the to effective display area, a desired shield function is not obtained for the TFT disposed in the vicinity of the gate lines or the vicinity of the TFT. More specifically, the light shield function is degraded in the area of a pile of adjacent red- and green-color filter layers among the piles of other two color filter layers, whereby it is difficult to effectively intercept the leakage of external light or backlight by using only the color filter layers. On the other hand, the structure wherein red- and blue-color filter layers formed in the peripheral area other than the effective display area of the LCD unit, such as described in Patent Publication-4, cannot use a single common pattern for the three color filter layers, thereby raising the cost of patterning the color filter layers due to the plurality of masks being used for the three color filter layers.

The structure of using four color filter layers, i.e., R-, Ye-, Cy- and B-color filter layers, wherein a pile of three color filter layers is used for the shield section for shielding the TFT area and a pile of two color filter layers, i.e., red- and blue-color filter layers, are used in the other area, such as described in Patent Publication-6, involves the problem as discussed hereinafter.

In the above structure wherein four color filter layers, i.e., R-, Ye-, Cy- and B-color filter layers are used to obtain the RGB colors in the color filter, although one of the steps of forming the resin black-matrix member is removed, a process of forming the color filter layers itself is increased by one step, which does not substantially reduce the cost for to the process for forming the black-matrix member. Although there is a recitation in the publication that a single Cy-color filter layer used for forming the blue-color pixel, the chromaticity of Cy represented on the x-y chromaticity coordinate (CIE1931 chromaticity system) is far larger than the chromaticity of B and roughly at the median in the coordinate between G and B. Thus, it is difficult to represent the B-color by using the Cy-color.

The pattern obtained by a pile of two or three color filter layers, as described in Patent Publications-1 to -4 and Non-patent literature-1, has an acute angle or right angle in general, and involves the problem as discussed hereinafter.

If the corner of a color layer pattern formed by a pile of two color filter layers, or three color filter layers in particular, has an acute corner angle, a problem arises wherein the fiber tip of a rubbing cloth used for a rubbing treatment cannot uniformly contact the surface of the pattern, in addition to the problem of the larger step difference. The insufficient contact of the fiber tip of the rubbing cloth causes an insufficient rubbing treatment, which involves a malfunction of orientation of the LC molecules.

As discussed heretofore, the CF substrate known in the art involves the problems of a larger step difference formed on the surface of the CF substrate, and an insufficient light shield function caused by using to a pile of two color filter layers for reducing the step difference. In short, the step difference and the light shield function are tradeoffs in the known CF substrate.

SUMMARY OF THE INVENTION

In view of the above problems, it is an object of the present invention to provide a CF substrate wherein the light shield member is obtained by forming a pile of a plurality of color filter layers, which is capable of achieving a sufficient light shield function and alleviating the influence caused by the step difference formed in the light shield member. It is another object of the present invention to provide a method for forming the CF substrate, and to provide a LCD unit including the CF substrate.

The present invention provides a color filter substrate for use in combination with a thin-film-transistor substrate that includes an array of pixels and associated thin film transistors disposed in a vicinity of intersections of gate lines and signal lines, the pixels each including an effective opening area and a shielded area encircling the effective opening area, the color filter substrate including: a color filter that includes at least three color filter patterns; a light shied pattern configured by the color filter patterns to oppose the shielded area, the light shield member including a first shield section that includes a pile of n (n is an integer not less than two and less than the at least three) of the color filter patterns, and a second shield section that includes a pile of the color filter patterns in number which is at least one larger than the n, the color filter patterns in the pile of the first and second shield sections extending from part of color filter patterns covering the effective opening area.

The present invention provides a liquid crystal display unit including the color filter substrate of the present invention as recited above.

The present invention also provides a method for manufacturing a color filter substrate for use in combination with a thin-film-transistor substrate that includes an array of pixels and associated thin film transistors disposed in a vicinity of intersections of gate lines and signal lines, the pixels each including an effective opening area and a shielded area encircling the effective opening area, the method including in a sequential order: forming, in a first area, a first color filter pattern including a stripe pattern extending in a direction parallel to the signal lines, and a pair of extension patterns extending from the stripe pattern in opposite directions parallel to the gate lines; forming, in a second area adjacent to the first area in a direction parallel to the gate lines, a second color filter pattern including a stripe pattern extending in a direction parallel to the signal lines, and a pair of extension patterns extending from the stripe pattern in opposite directions parallel to the gate lines; and forming, in a third area adjacent to the second area in the direction parallel to the gate lines, a third color filter pattern including a stripe pattern extending in a direction parallel to the signal lines, and a pair of extension patterns extending from the stripe pattern in opposite directions parallel to the gate lines, to form a light shield member, the shield member including a first shield section that includes a pile of two of the first through third color filter patterns, and a second shield section that includes a pile of the first through third color filter patterns, the second shield section opposing the thin film transistor and a vicinity thereof, the color filter patterns in the pile of the first and second shield sections extending from part of color filter patterns covering the effective opening area.

The above and other objects, features and advantages of the present invention will be more apparent from the following description, referring to the accompanying drawings.

BRIEF DESCRIPTION OF THE DRAWINGS

FIGS. 13A to 13C are top plan views of the masks used for fabricating a CF substrate according to a fifth exemplary embodiment of the present invention.

EXEMPLARY EMBODIMENTS

Figure 1:
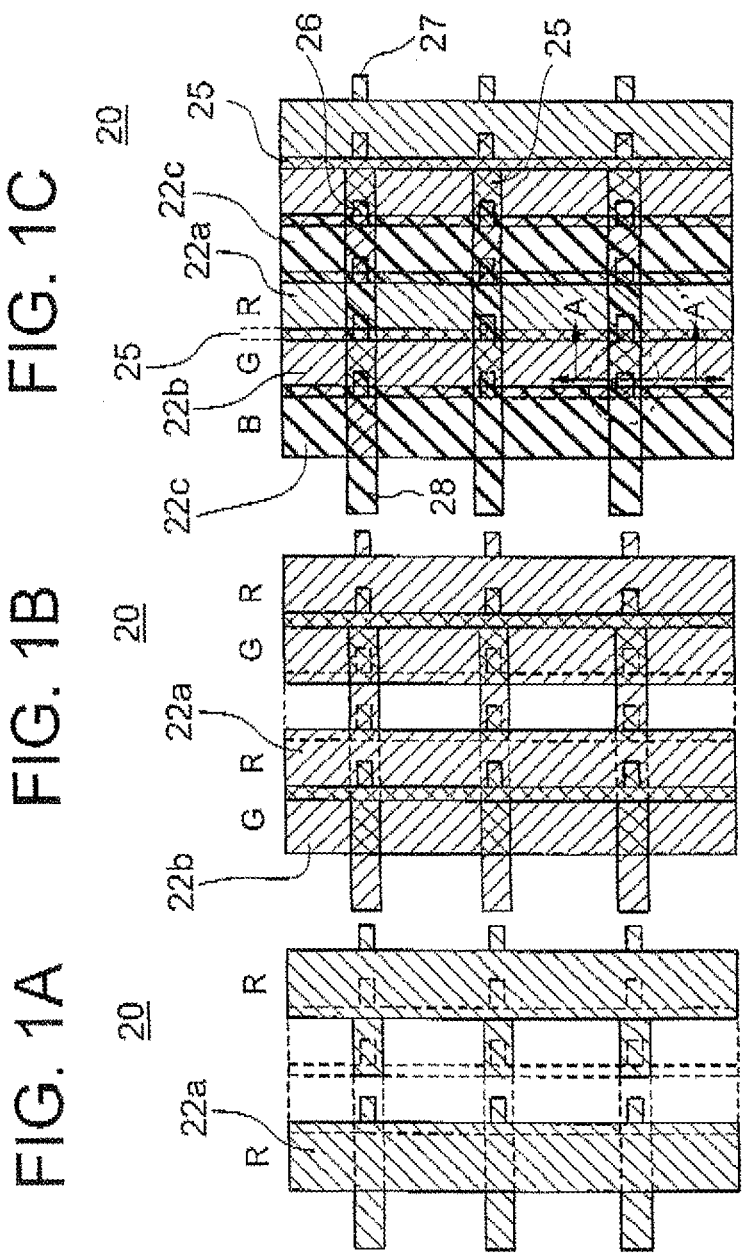
FIG. 1A to 1C are top plan views showing a color filter in consecutive steps of fabrication of a CF substrate according to a first exemplified embodiment of the present invention.

Now, the present invention will be described in more detail with reference to exemplary embodiments thereof, with reference to accompanying drawings, wherein similar constituent elements are designated by similar reference numerals or signs.

The basic structure of the CF substrate of the present invention is exemplified in FIG. 1C, which shows a top plan view of a portion of a color filter in a CF substrate according to a first exemplary embodiment of the present invention. The structure shown in FIG. 1 will be described as a typical example of the present invention.

The CF substrate 20 according to the first exemplary embodiment of the present invention is typically provided in an active-matrix LCD unit (not shown), and includes a color filter including a light shield member obtained by forming a pile of a plurality of color filter layers that configure the pattern of the color filter. The color filter pattern includes a red (R) area configured by a red-color (R-color) layer 22a, a green (G) area configured by a G-color layer 22b and a blue (B) area configured by a blue-color (B-color) layer 22c. The light shield member includes a to first shield section 25 that separates each pixel from another pixel and also separates each color area (pixel) from another color area (pixel), and a second shield section 26 that shields a TFT area including a TFT acting as a switching device and the vicinity thereof. The second shield section 26 is configured by a pile of three color filter layers, whereas the first shield section 25 is configured by a pile of two color filter layers. The second shield section 26 may be configured by four or more color filter layers, whereas the first shield section 25 may be configured by color filter layers in number less than the number of color filter layers in the second shield section 26. The first shield section 25 also includes a small area adjacent to the second shield section 26.

In the configuration of the first exemplary embodiment, the light shield member includes the second shield section 26 including a pile of three color filter layers only on the TFT area, thereby limiting the area of the second shield section 26 that may have a larger step difference. The first shield section 25, which includes a pile of a less number of color filter layers, occupies most part of the light shield member and provides a smaller step difference with respect to the effective opening area of each pixel. Due to this configuration, encapsulation of the liquid crystal (LC) in the LC panel by using an injection technique or dropping technique in the process for manufacturing the LCD unit is less involved with a malfunction of the LC layer in the LCD unit, because the LC molecules spreads uniformly within the cell gap of the LC panel.

In addition, the structure wherein the light shield member configured by the color filter layers may include a larger sub-pattern (first shield section) and a smaller sub-pattern (second shield section) that extends from the larger sub-pattern provides a higher mechanical strength, thereby preventing peel-off of the light shield member from the CF substrate especially in the smaller sub-pattern. This improves product yield of the LCD unit. In addition, the smaller area of step difference on the CF substrate reduces the degree of ununiformity on the surface of the orientation film, thereby preventing a malfunction of the orientation film caused by an insufficient rubbing treatment.

In the above configuration of the light shield member, each of the color filter layers 22a, 22b, 22c includes a stripe pattern that extends in the column direction of the pixels, and a pair of extension patterns 27, 28 for each pixel that extend from the stripe pattern in the row direction. The TFT area is shielded by the second shield section 26 configured by a pile of three color filter layers 22a, 22b, 22c, wherein a portion of the stripe pattern is overlapped with two extension patterns extending from the adjacent two stripe patterns.

The structure of the color filter layers 22a, 22b, 22c each including a stripe pattern and a pair of extension patterns 27, 28 and provided in the TFT area efficiently provides the second shield section 26 configured by a pile of three color filter layers for shielding the TFT area. This structure also efficiently provides the first shield section 25 configured by a pile of two color filter layers as well as the second shield section 26, substantially without reducing the effective opening area of the pixel.

At least two of the color filter layers among the three color filter layers configuring the first shield sections 25 may have a substantially common shape in the display area, except for the peripheral area of the CF substrate outside the display area.

The common shape of at least two of the color filter layers configuring the light shield member allows a common mask pattern to be used for the at least two color filter layers on the CF substrate. More specifically, a single mask pattern can be used for the at least two color filter layers, to thereby reduce the number of exposure processes, thereby reducing the cost for fabrication of the CF substrate.

The configuration wherein all of the color filter layers have a substantially common shape is most preferable.

The pair of extension patterns 27, 28 may preferably have an edge which forms a right angle or obtuse angle with respect to the side edge of the stripe pattern of the color filter layers.

The obtuse angle of the edge of the extension patterns with respect to the side edge of the stripe pattern of the color filter layers provides a suitable shape for the second shield section 26. The obtuse angle prevents particles of the orientation film occurring in the rubbing treatment thereof from being attached onto remaining orientation film having a surface portion reflecting the corner formed between the stripe pattern and the extension patterns.

The light shield member may have a configuration wherein an intervening section including a pile of two color filter layers, which may be referred to as the first shield section, is provided between the second shield section including a pile of three color filter layers and the effective opening area including a single color filter layer. If the second shield section includes four or more color filter layers, the first shield section may include color filter layers in number which is at least one less than the number of color filter layers in the second shield section.

If the second shield section including a pile of three or more color filter layers is provided adjacent to the area of the single color filter layer, a large step difference formed therebetween may cause a malfunction of the orientation film. The above structure wherein the first shield section is provided between the second shield section and the effective opening area solves this problem.

In the above configuration, wherein the second shield section shielding the TFT area and including a pile of three or more color filter layers is provided with the first shield section at a periphery of the TFT area, the additional shield section is preferably formed as a stripe pattern and by one of the pair of extension patterns that include a large extension pattern 28 and a small extension pattern 27 both extending from the stripe pattern in opposite directions. This configuration allows most of the area of the light shield member to be configured by a pile of two color filter patterns. In this structure, the occupied area of the second shield section including a pile of the three or more color filter layers can be reduced to a minimum, whereby the area of the step difference can be further reduced.

Since the color filter pattern that does not configure the additional shield section may be a stripe pattern covering a plurality of the effective opening areas, the possibility that the color filter pattern is partially removed or peeled off by a water flow during cleaning or developing of the color filter pattern is reduced due to the absence of a pattern smaller than the pattern of the effective opening area. This improves the product yield of the LCD unit. Further, since the ununiformity caused by the step difference on the surface of the orientation film is reduced, a uniform image quality can be obtained. The particles of the orientation film occurring during the rubbing treatment thereof and attached onto the step difference of the orientation film may cause ununiformity on the surface of the orientation film, which causes undesirable leakage light and reduces the contrast ratio of the LCD unit. The ununiformity of the orientation film can be alleviated in the configuration of the above structure which prevents the leakage light upon display of a dark state.

The larger extension pattern 28 extends beyond a far edge of the TFT area or second shield section 26 whereas the smaller extension pattern 27 extends up to the far edge of the TFT area or second shield section 26. The possibility that the smaller extension pattern 27 is peeled off from the CF substrate is smaller than the possibility that the larger extension pattern 28 is peeled off. Thus, the number of extension patterns that are liable to peel-off of the pattern can be reduced. The reduced area of the step difference reduces the possibility of occurring of a malfunction of the orientation film caused by the insufficient rubbing treatment. This provides a uniform distribution of the LC molecules.

In general, the adhesion strength between the color filter layer and the glass substrate is smaller than the adhesion strength between the color filter layers including the same material and thus having the same property. The configuration wherein the smaller extension pattern 27 of the color filter pattern is not in contact with the glass film or wherein the smaller extension pattern 27 has a smaller contact area with respect to the glass substrate reduces the possibility of the peel-off of the color filter layer from the glass substrate.

In an alternative, the color filter layer which is in contact with the glass substrate does not have a pair of extension patterns, which further reduces the possibility of occurring of the peel-off.

A configuration may be employed wherein the color filter layer that is first formed among the three color filter layers is the G-color layer, for example. In this configuration, the additional shield section does not include the G-color layer pattern, and has the two-layer structure including R- and B-color layer patterns. The R-color layer has a property of effectively preventing the external leakage light from entering the TFT area whereas the two-layer structure including R- and B-color layer patterns has a sufficient shield function or suitable optical density. Thus, both the superior TFT characteristic obtained by prevention of the external leakage light and a suitable optical density that effectively shields the TFT area can be obtained in the LCD unit, to achieve a superior image quality.

As described heretofore, the basic structure of the present invention and exemplified configurations of the above structure achieve the advantages of sufficient shield function and alleviation of the influence by the step difference. The structures which may be employed in the present invention will be described hereinafter.

Figures 34A, 34B:
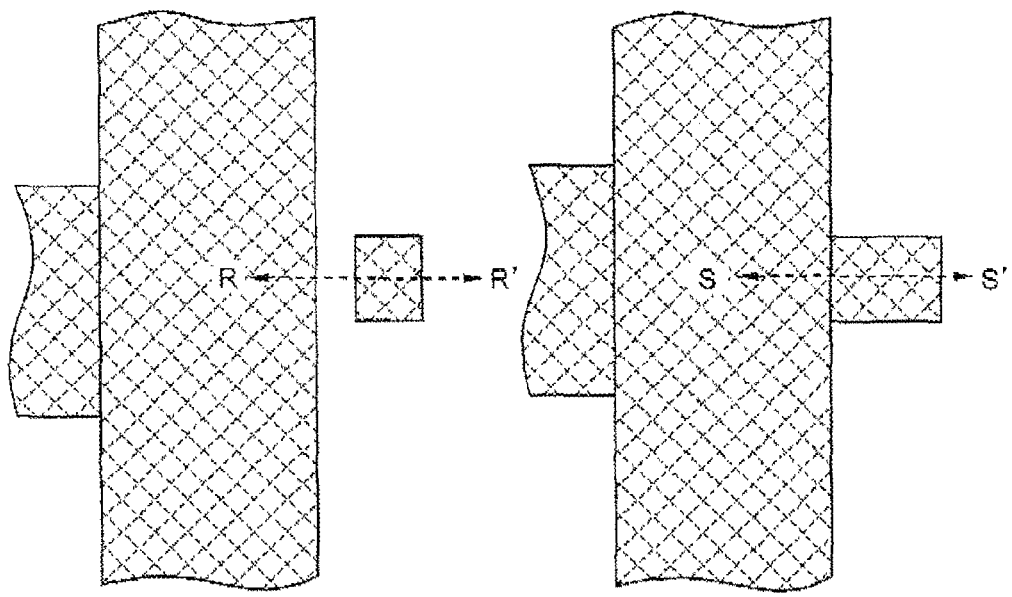
FIGS. 34A and 34B are top plan views showing different types of color filter pattern including an isolated pattern (comparative example) and an extension pattern (embodiment), respectively.
Figure 35:
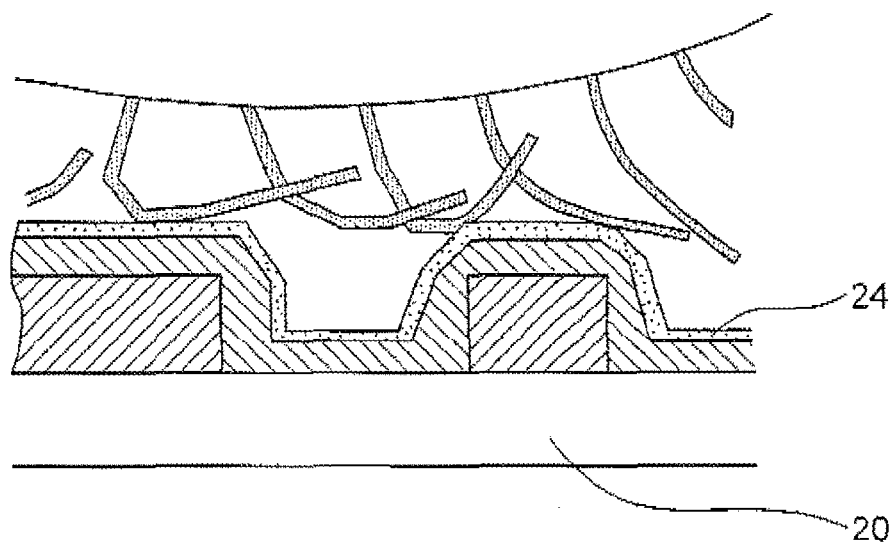
FIG. 35 is a sectional view corresponding to a section taken along line R-R' in FIG. 34A and showing the step of rubbing the isolated pattern.
Figure 36:
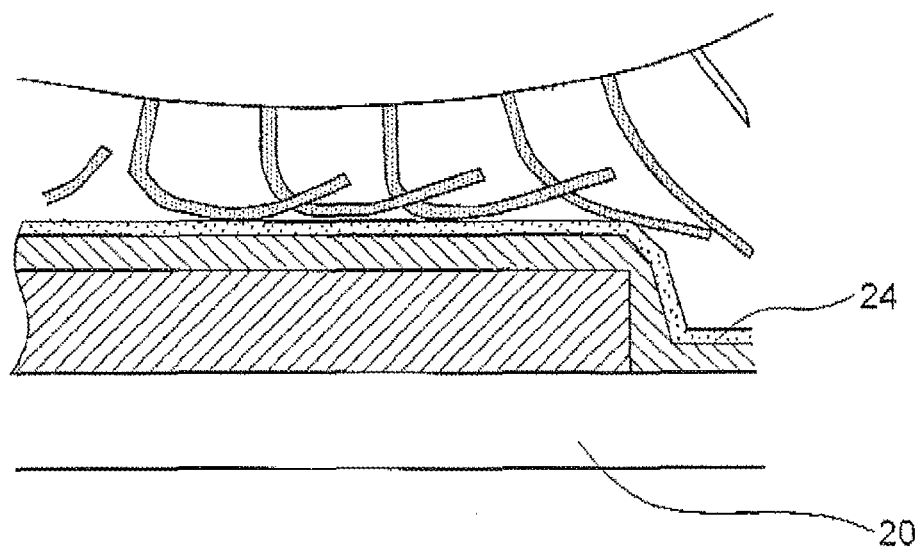
FIG. 36 is a sectional view corresponding to a section taken along line S-S' in FIG. 34B and showing the step of rubbing the extension pattern.

(1) FIG. 34A shows a known color filter pattern presented herein as a comparative example, whereas FIG. 34B shows the color filter pattern of an exemplary embodiment of the present invention. FIG. 35 is a sectional view corresponding to a section taken along line R-R' in FIG. 34A during a rubbing treatment of the orientation film overlying the color filter pattern of FIG. 34A. FIG. 36 is a sectional view corresponding to a section taken along line S-S' in FIG. 34B during a rubbing treatment of the orientation film overlying the color filter pattern of FIG. 34B. In FIG. 34A, the color filter layer shown therein includes a stripe pattern and an isolated pattern, which is typically used in a conventional technique. In FIG. 34B, the color filter layer shown therein includes a stripe pattern and an extension pattern extending from the stripe pattern.

During the rubbing treatment of the orientation film overlying the color filter layer, the rubbing cloth moves in the direction roughly perpendicular to the stripe pattern, i.e., roughly in the row direction in this example, as shown in FIGS. 35 and 36. For the structure of FIG. 34A, the rubbing cloth moves in the row direction and passes a depression formed between the stripe pattern and the isolated pattern, as shown in FIG. 35. For the structure of FIG. 34B, the rubbing cloth moves in the row direction on the extension pattern and stripe pattern without passing a depression, as shown in FIG. 36. The depression shown in FIG. 35 may cause an insufficient orientation due to the presence of the depression, which necessitates the rubbing cloth to rise and fall on the step difference. In the structure of FIG. 36, the insufficient rubbing treatment can be prevented, and in addition, foreign particles generated by the rubbing treatment are not caught on the orientation film due to the absence of the depression between the stripe pattern and the extension pattern. Thus, degradation of the image quality due to the presence of the foreign particles and insufficient rubbing treatment can be avoided in the present invention.

(2) The configuration wherein the stripe pattern is attached with a pair to of extension patterns extending in the opposite directions, if employed, provides the structure of the second shield section with a superior efficiency substantially without a reduction of the effective opening area of the pixel.

In the above structure, the light shield member includes the first shield section having a two-layer structure and shielding the boundary between the pixels, and the second shield section having a three-layer structure and shielding the TFT area. It is to be noted however that it is sufficient that the number of layers in the first shield section be at least one smaller than the number of layers in the second shield section in the present invention.

Figure 5:
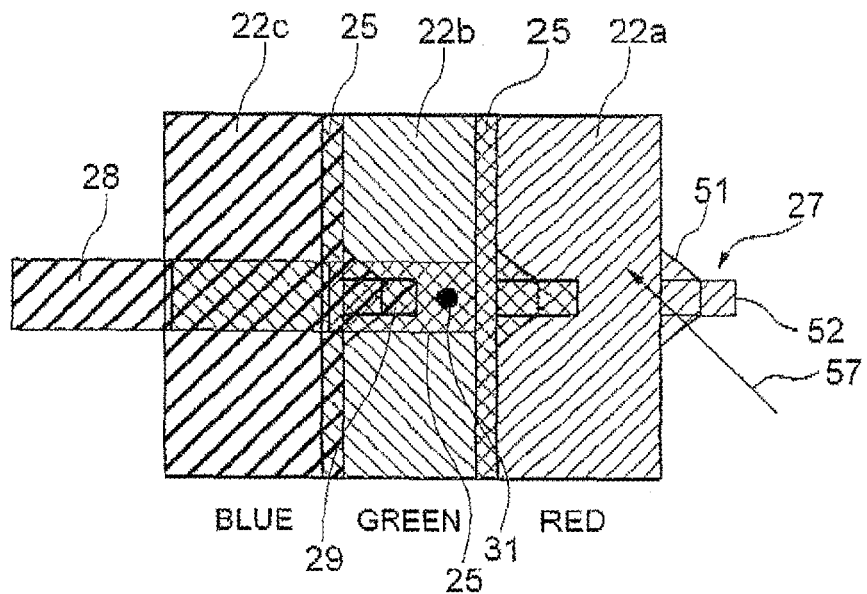
FIG. 5 is a top plan view of a light shield member for shielding the TFT area in a CF substrate according to a second exemplary embodiment of the present invention.

As depicted in FIG. 5, the pair of extension patterns include a smaller-sized (first) extension pattern 27 at the right side of the stripe pattern and a larger-sized (second) extension pattern 28 at the left side of the stripe pattern. The smaller-sized extension pattern 27 has a tapered base portion (gate-line shield portion) 51 that is located on the gate lines and reduces the width thereof in the direction of protrusion, and a distal portion (TFT shield portion) 52 that has a constant width and is located on the TFT area. This structure is employed in consideration of the rubbing direction in the rubbing treatment. Assuming that the angle of rubbing direction 57 with respect to the edge of the extension pattern 27 is χ as shown in FIG. 5, the area subjected to the rubbing treatment is smaller in the TFT shield portion than in the gate-line shield portion. The structure wherein the starting position (TFT shield portion) of the light shield member in the rubbing treatment has an area smaller than the area of the succeeding position (gate-line shield portion) provides a smooth rubbing treatment in the portion having a step difference, to achieve a higher rubbing quality.

(3) The color filter pattern provided in the display area other than the peripheral area of the LCD unit may have a common shape irrespective of the color of the color filter layers.

The above structure allows a plurality of color filter patterns to be formed by using a single mask pattern. Thus, the number of mask patterns used in the exposure process can be reduced. It is to be noted however that it is not needed that all of the color filter patterns in the LCD unit be formed by using a single mask pattern although such a configuration achieves minimum cost for the mask pattern.

(4) The tapered base portion of the smaller-sized extension may preferably have an angle of 90 degrees or above (obtuse angle) with respect to the exposed edge of the stripe pattern, as shown in FIG. 5.

If the above angle is an acute angle that is less than 90 degrees, the corner portion of the color filter pattern may be attached with particles of the orientation film generated in the rubbing treatment. The particles may cause a malfunction of orientation of the LC molecules. The obtuse angle, if employed, prevents such a malfunction.

(5) The first shield section is preferably provided at any space between the second shield section and the effective opening area of each pixel, the first shield section including color filter layers in number which may be equal to the number of color filter layers on the boundary between adjacent effective opening area and may be at least one less than the number of color filter layers in the second shield section.

If the second shield section including a pile of three color filter layers is located adjacent to the effective opening area including a single color filter layer, the boundary will have a large step difference, which may cause a malfunction of orientation in the LC layer. The first shield section intervening in this boundary prevents such a malfunction.

Figure 2:
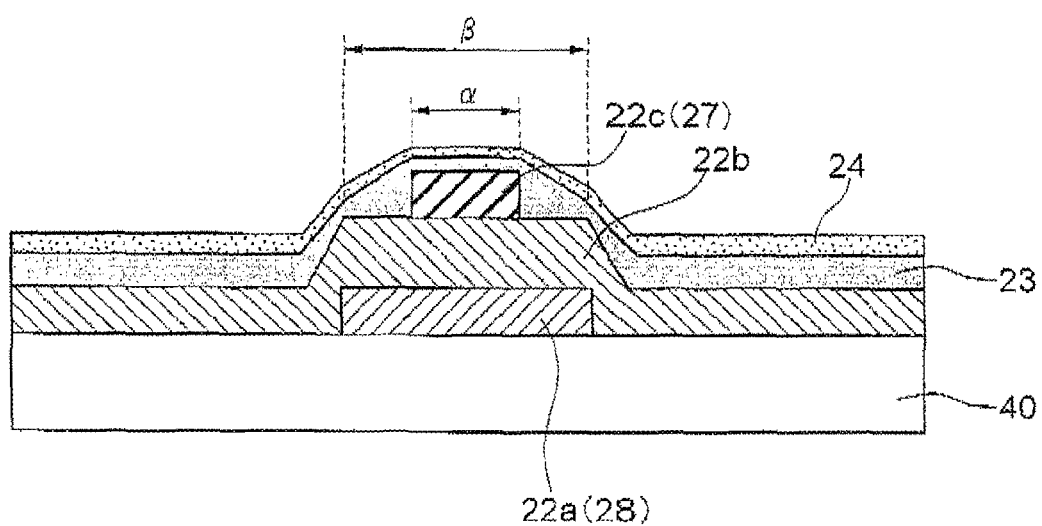
FIG. 2 is a sectional view taken along line A-A' in FIG. 1C for showing a second shield section of the light shield member formed in the color filter.

The step difference in this structure may provide a mesa structure or ordinary tapered structure such as shown in FIG. 2, which allows the LC molecules to ride over the step difference without difficulty and improves wettability (spreading capability) of the LC molecules. Thus, ununiformity of the cell gap or malfunction of injected LC will be prevented.

In the known structure of the LCD unit, as described before, the light shield member for shielding the drain lines, gate lines, TFTs and the vicinity of the TFTs includes, instead of black matrix member, two color filter layers or three color filter layers, the color filter layers being used for display of color image in the effective opening area of each pixel.

The two-layer structure may cause a larger amount of off-leakage light of TFTs if a light having a large intensity is passed by the two-layer shield pattern to be incident onto the TFTs, the off-leakage current flowing across the TFTs which are turned OFF. The off-leakage current prevents the LCD unit from representing an excellent image quality.

On the other hand, the known three-layer structure may cause a large step difference between the effective opening area of each pixel and the light shield member due to a larger difference in thickness. The larger step difference prevents, during the injection or drop-on step, a smooth flow of LC molecules to cause ununiformity of the cell gap, thereby causing a malfunction of orientation of LC molecules in the vicinity of the step portion.

In consideration of the above malfunctions, an exemplary embodiment of the present invention provides the structure wherein the light shield member includes a first shield section that includes a pile of n (n is an integer not less than two and less than the at least three) of the color filter patterns, and a second shield section that includes a pile of the color filter patterns in number which is at least one larger than the n, the color filter patterns in the pile of the first and second shield sections extending from part of color filter patterns covering the effective opening area.

In addition to the above configuration, the plurality of color filter patterns each include a stripe pattern extending in a direction parallel to the signal lines, and each of at least two of the color filter patterns includes first and second extension patterns extending from the stripe pattern in opposite directions which are parallel to the gate lines.

The first extension pattern is smaller than the second extension pattern, and the second shield section includes a pile of the stripe pattern, first extension pattern and second extension pattern each belonging to different one of the color filter patterns.

The at least three color filter patterns include first through third color filter patterns consecutively and periodically arranged in a direction parallel to the gate lines so that the first extension pattern of the third color filter pattern is apart from the second extension pattern of the first color filter pattern.

The first extension pattern and/or second extension pattern includes a tapered base portion and a constant-width distal portion extending from the tapered base portion.

Now the present invention will be further described with reference to specific exemplary embodiments shown in the drawings.

First Exemplary Embodiment

The structure of the CF substrate according the first exemplary embodiment is described before. In the process for manufacturing the CF substrate of the first exemplary embodiment, a single mask pattern is used for all of the color filter patterns. As shown in FIG. 1A, a red (R) color filter pattern 22a is first formed in the R pixel area and a light shield area, followed by forming a green (G) color filter pattern 22b adjacent to the R-color filter pattern 22a while overlapping the same at the boundary as well as the TFT area, as shown in FIG. 1B. Subsequently, a blue (B) color filter pattern 22c is formed between the area of the R-color filter pattern 22a and the area of the G-color filter pattern while overlapping the same at the boundary as well as the TFT area, as shown in FIG. 1C. In this structure, as shown in FIG. 1C, the boundary between two effective opening areas includes a pile of two color filter patterns which configures a first shield section 25, whereas the TFT area includes a pile of three color filter patterns which configures a second shield section. The vicinity of the TFT area is also provided with a first shield section 25 that includes a pile of two color filter layers.

Figure 3:
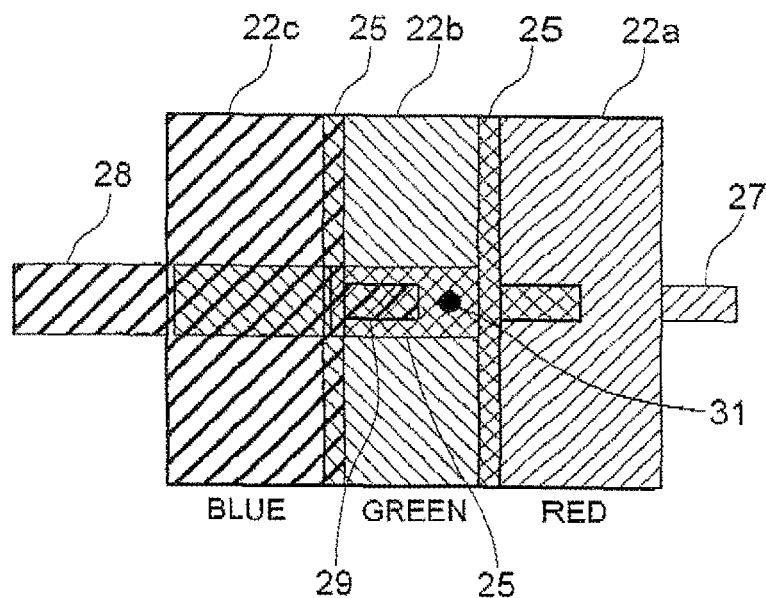
FIG. 3 is a detailed partial top plan view of the color filter shown in FIG. 1C.

FIG. 2 is a sectional view taken along line A-A' in FIG. 1C for showing the layer structure of the TFT area, and FIG. 3 is a detailed partial top plan view of the color filter shown in FIG. 1C. The structure shown in FIG. 2 includes a transparent substrate 40, and a layer structure including a larger-sized extension pattern 28 of the R-color filter pattern (R-color pattern) 22a, a striped pattern of the G-color filter pattern (G-color pattern) 22b, a smaller-sized extension pattern 27 of the B-color filter pattern (B-color pattern) 22c, an overcoat film 23 and an orientation film 24, which are consecutively formed on the transparent substrate 40.

The two-layer structure including a pile of the stripe pattern of the R-color pattern 22a and the stripe pattern of the G-color pattern 22b, for example, configures the main portion of the first shield section 25 that shields the boundary between both the color filter patterns 22a, 22b, whereas the three-layer structure including a pile of the smaller-sized extension pattern 27 of the B-color pattern 22c, the stripe pattern of the G-color pattern 22b and the larger-sized extension pattern 28 of the R-color pattern 22a, for example, configures the second shield section 29 of the light shield section that shields the TFT area. A pile of the larger-sized pattern 28 of the G-color pattern 22b and the stripe pattern of the R-color pattern 22a excepting the area of the second shield section 29 configures another portion of the first shield section 25. In FIG. 2, the smaller-sized extension pattern 27 of the B-color pattern 22c overlaps the second extension pattern 28 of the R-color pattern and yet has an edge deviated from any edge of the larger-sized pattern 28 of the R-color filter 22a as viewed normal to the color filter patterns.

Figure 33:
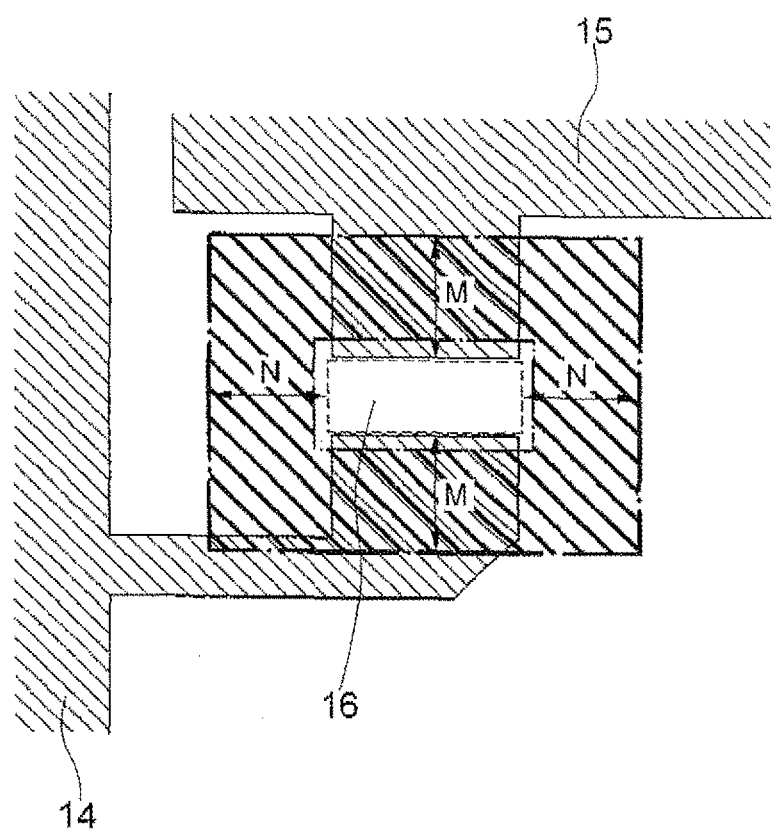
FIG. 33 is a top plan view exemplifying the definition of a TFT area including a TFT and the vicinity thereof.

The "TFT area" as used above is exemplarily defined here with reference to FIG. 33, which shows the arrangement of a pixel in the TFT substrate opposing the CF substrate. In FIG. 33, only a pixel electrode 15 of the pixel associated with the TFT, a drain lines (signal lines) 14 supplying a data signal to the TFT and source/drain of the TFT are depicted for a simplification purpose. The TFT area includes the location of the TFT and the vicinity of the TFT. The vicinity of the TFT is defined by an area between an inner periphery thereof that is 2 μm apart from the channel (dotted line) 16 of the TFT and shown by a one-dot chain line and an outer periphery thereof that is 14 μm (shown by reference M and N) apart from the channel 16. The dimension of M and N is suitably determined in consideration of the dimensional accuracy of the pattern during a manufacturing process of the CF substrate, alignment accuracy between the TFT substrate and the CF substrate, an incident angle of the external light entering through the CF substrate to the LC layer etc.

In FIG. 3, the light shield member is configured by the color filter patterns 22a, 22b, 22c including RGB stripe patterns and extension patterns 27, 28 extending from the stripe patterns. The larger-sized extension pattern 28 mostly shields the gate lines in the widthwise direction, and the smaller-sized extension pattern 27 mostly shields the TFT area. The light shield member shown therein includes no isolated pattern isolated from the stripe pattern. If there is an isolated (island) pattern such as a rectangle pattern having a side equal to or smaller than 20 μm, for example, in the light shield member, a cleaning or developing process may cause peel-off etc. of the isolated pattern. In the present embodiment, the extension pattern extending from the stripe pattern has a larger mechanical strength with respect to the peel-off from the transparent substrate.

Figure 4:
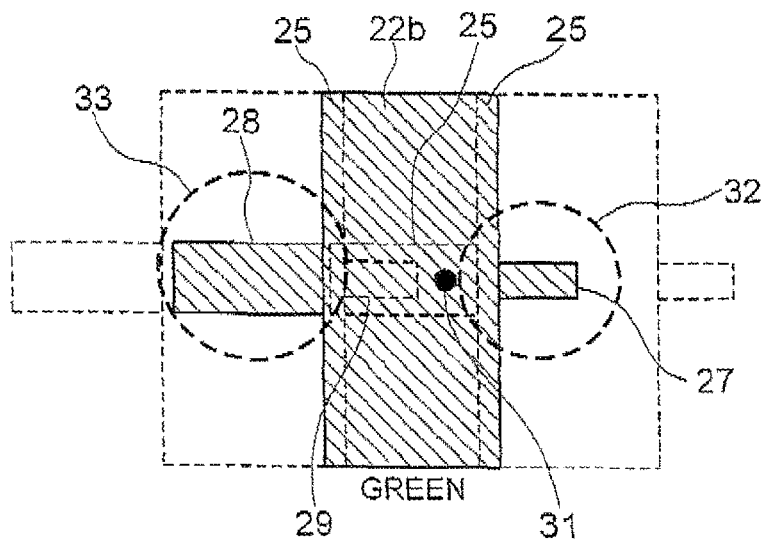
FIG. 4 is a top plan view showing the green-color (G-color) layer of the color filter of FIG. 3.
Figure 29:
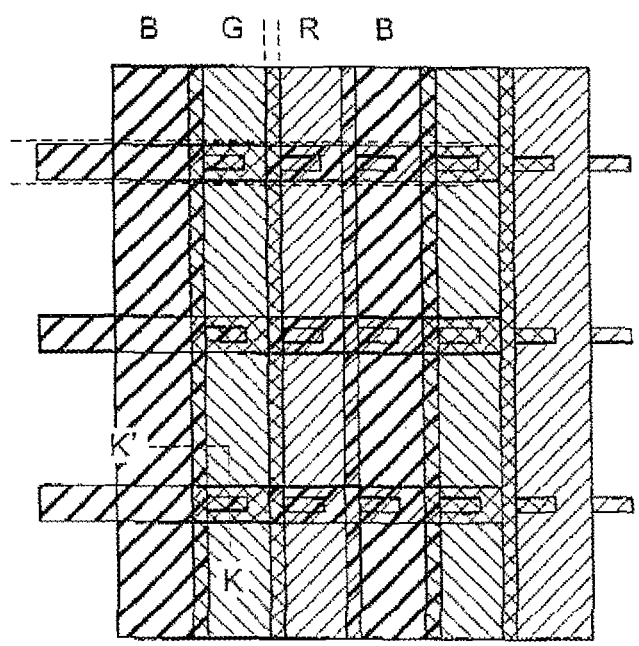
FIG. 29 is a schematic top plan view of a combination of the CF substrate of the first exemplary embodiment and a TFT substrate.
Figure 30:
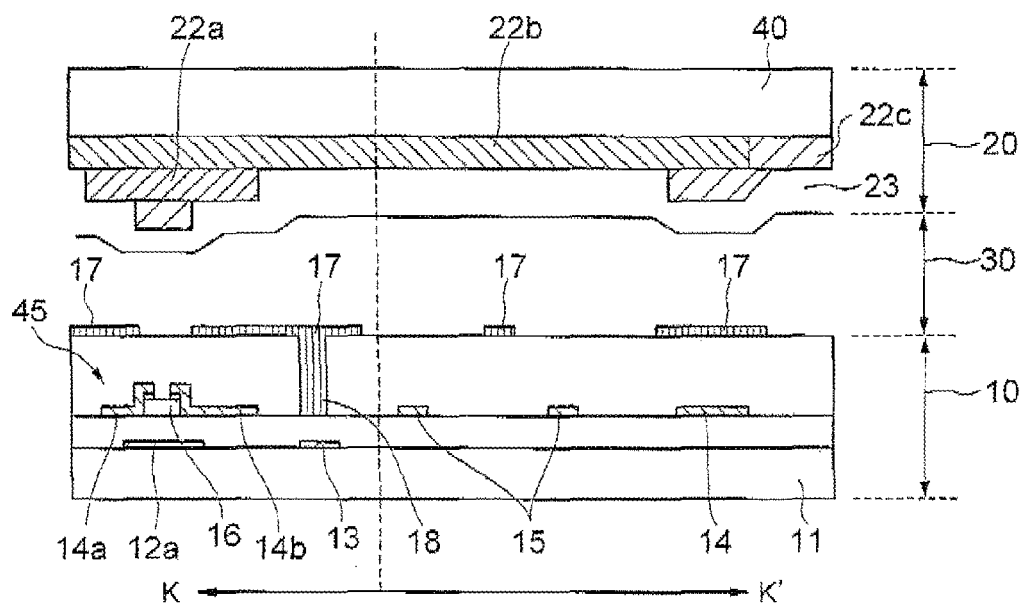
FIG. 30 is a sectional view taken along line K-K' in FIG. 29.

FIG. 4 shows the detail of a portion of the light shield member shown in FIG. 3. Each pattern shown in FIGS. 3 and 4 is iteratively formed in the direction A-A' shown in FIG. 1C to form the stripe pattern in the present embodiment. After a first-layer color filter pattern, e.g., R-color pattern 22a is formed on the transparent substrate, a second-layer color filter pattern, i.e., a G-color pattern 22b having the same dimensions is formed adjacent to the R-color pattern 22a with some overlapping portion that configures the first shield section 25. Thereafter, a third-layer color filter pattern, i.e., B-color pattern 22c having the same dimensions is formed adjacent to the G-color pattern 22b and the R-color pattern 22a with some overlapping portion that configures the first shield section 25. The width of the overlapping portion 25 of the stripe patterns corresponds to the width of the data lines, and corresponds to a distance that is sufficient to prevent mixing of colors from the adjacent stripe patterns. Pillar spacers 31 are disposed in the additional part of the first shield section 25. FIG. 30 is a sectional showing a LC panel including a TFT substrate 10 and the CF substrate 20 of the present embodiment. FIG. 30 is taken along line K-K' in FIG. 29 which exemplifies a color filter in the CF substrate.

The CF substrate 20 includes the transparent substrate 40, a color filter including three color filter layers 22a, 22b, 22c, an overcoat film 23 covering the color filter layers, and an orientation film (not specifically depicted). The TFT substrate 10 includes: a transparent substrate 11; gate electrode 12a and common electrode line 13 which are formed on the transparent substrate 11; source/drain electrodes 14a, 14b opposing horizontally each other with an intervention of a channel 16; pixel electrodes 15 and drain lines 14 which are also formed as the common layer with the source./drain regions 14a and 14b; and an orientation film (not show). A LC layer 30 is sandwiched between the TFT substrate 10 and the CF substrate 20.

Figure 31:
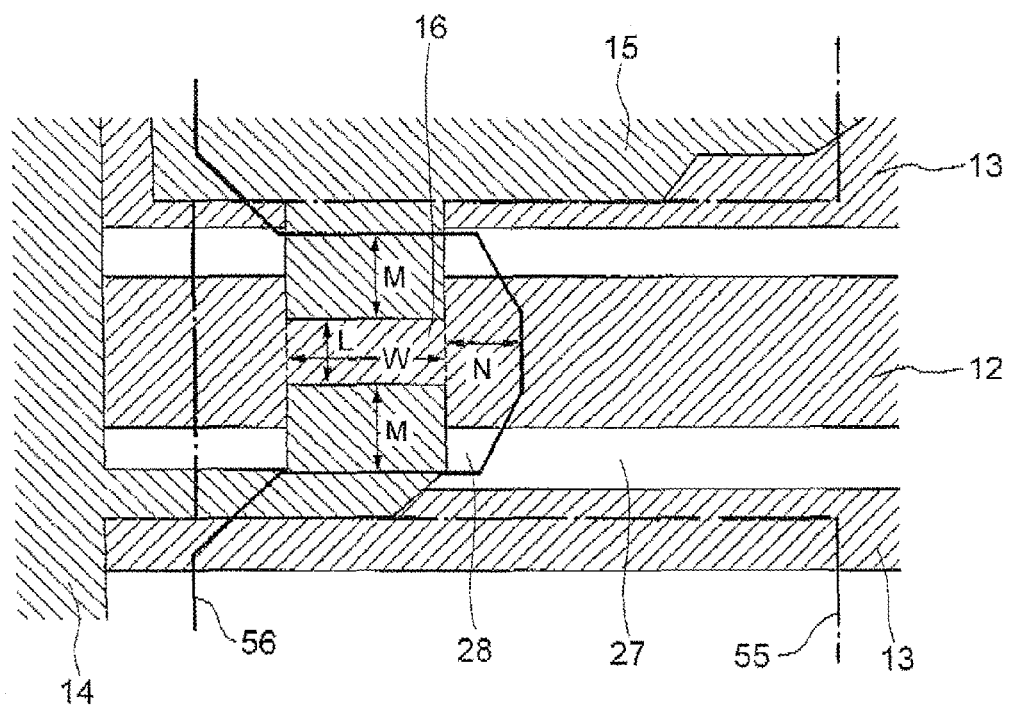
FIG. 31 is detailed top view of the combination of FIG. 29, showing the area of pile of three color filter layers and the area of a pile of two color filter layers.
Figure 32:
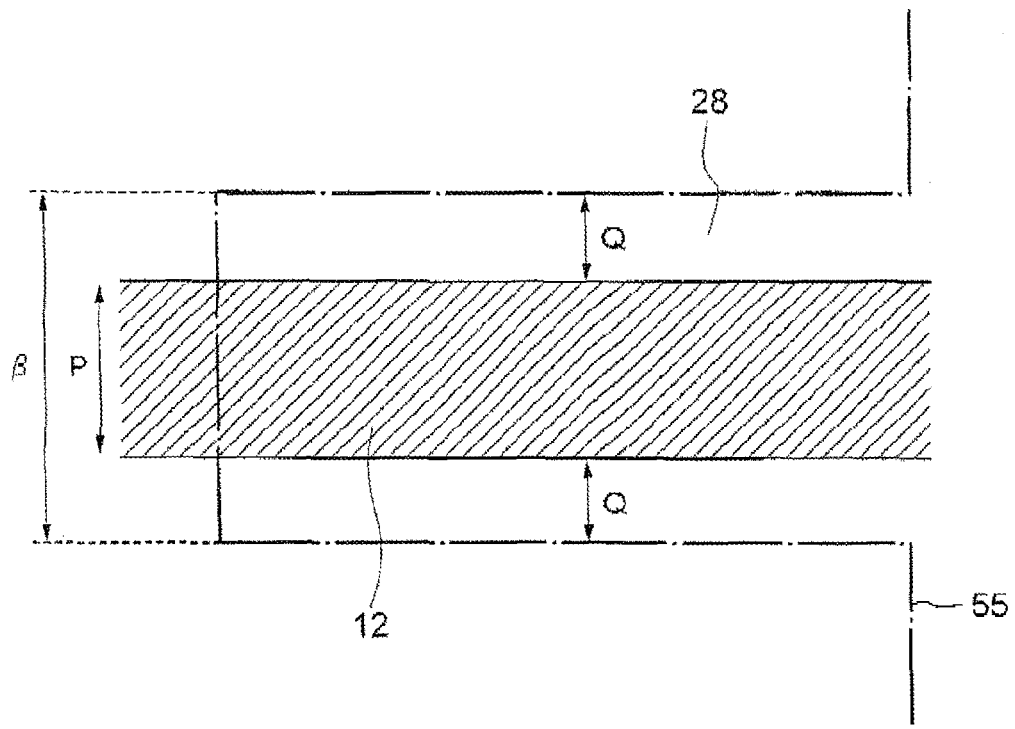
FIG. 32 is a detailed top view of the combination of FIG. 29, showing the positional relationship between the area of the a pile of two color filter layers and a gate lines.

FIGS. 31 and 32 show arrangement of the TFT 45 shown in FIG. 30, and the light shield member, wherein the pixel electrode 15, common electrode line 13, gate lines 12, drain lines 14, first shield section and second shield section are depicted. The first shield section has a boundary denoted by numeral 55, whereas the second shield section has a boundary denoted by numeral 56.

It is assumed here that that the channel 16 of the TFT defined by dotted line has an area of W×L in FIG. 31, and that the second shield section including a pile of three color filter patterns and defined by a one-dot chain line 55 overlaps the channel 16 and protrudes from the channel 16 by dimensions M and N in the extending direction of the channel 16 and perpendicular thereto, respectively. The dimensions M and N are determined in consideration of the cell gap of the LC panel and thickness of the color filter patterns. For example, the dimensions M and N are determined by estimating the dimension that causes no external light or a minimum amount of external light, and adding thereto to a margin depending on the overlapping accuracy between the TFT substrate 10 and the CF substrate 20.

In FIG. 32, it is assumed that β, P and Q are the width of the third shield section 25a including a pile of two color filter patterns 22a, 22c, width of the gate lines 14 and amount of protrusion of the additional portion of the first shield section 25 from the gate lines 14, respectively. The amount of protrusion Q is determined at a value larger than the horizontal deviation between the TFT substrate 10 and the CF substrate 20 for preventing the external light from reflecting toward the TFT to thereby degrade the image quality.

The dimensions L, W etc., shown in FIGS. 31 and 32 depend on the size of the LC panel, and may be determined so that L=6.0 μm, W=12.0 μm, M=6.0 μm, N=6.0 μm, P=14.0 μm, Q=11.0 μm, and β=36.0 μm, for example.

A concrete example of the process for manufacturing the color filter will be described hereinafter. Although the process for manufacturing the color filter may use any of the printing technique, photolithographic technique and etching technique, the color filter is preferably manufactured by the photolithographic technique in the view point of higher definition and controllability or reproducibility of the spectral characteristic. The photolithographic process includes the steps of dispersing pigments together with photoinitiator and polymerized monomer into a suitable resin solvent to prepare a coloring compound, applying the resultant coloring compound onto a transparent substrate to form a color film, and developing and washing the resultant color film to form a color filter pattern. This process is iterated for obtaining the three color filter patterns.

More specifically, the process includes the steps of spin-coating a R-color compound onto a glass substrate, drying the resultant color film under a reduced ambient pressure, pre-baking the color film, exposing the color film to light by using a photoresist mask, and developing, washing and post-baking the resultant color film to form the R-color pattern. The process includes subsequent steps of forming G-color pattern and then B-color pattern. The order of forming the R-color pattern and B-color pattern may be reversed. At this stage, each color filter pattern has a spatial periodicity in the extending direction of the stripe pattern. All the color filter patterns have a common pattern, whereby a common mask can be used in the exposure process for all of the color filter patterns.

The above process reduces the cost for the mask pattern; however, this process is typically used for the LCD unit that does not include a light shield member on the peripheral area of the LCD unit. If the pattern outside the display area, i.e., the light shield member in the peripheral area of the LCD unit is needed, at least two of the color filter patterns out of the three color filter patterns can be formed using the common mask pattern. More specifically, an exposure mask including the peripheral shield pattern is used for patterning the R-color pattern and B-color pattern to form a first shield section including a pile of two color filter patterns in the display area and the peripheral area. Subsequently, another exposure mask including the display area pattern and no peripheral area pattern is used for patterning the G-color pattern. This process provides a color filter including the first shield section including a pile of two color filter patterns in the peripheral area, and the second shield section including a pile of three color filter patterns in the TFT area in the display area of the LCD unit.

It is to be noted that the process may include the steps of forming the G-color pattern by using an exposure mask including the display area pattern and peripheral area shield pattern, and forming the R-color pattern and B-color pattern by using another mask including the display area pattern and no peripheral area shield pattern, to thereby obtain a three-color-layer shield pattern in the TFT area, a two-color-layer shield pattern in the display area, and a single-color-layer shield pattern in the peripheral area. However, since this process provides the single-color-layer shield pattern in the peripheral area, the shield function in the peripheral area is somewhat inferior to the case of the two-color-layer shield pattern in the peripheral area.

As described heretofore, the manufacturing process using the common exposure mask includes the steps of patterning the color filter layers in number which is at least one less than the number (n; n≧3) of color filter layers by using the shield mask pattern including the peripheral area shield pattern, to form a two-color-layer shield pattern in the display area and a two-color-layer shield pattern in the peripheral area, and patterning the color filter layers by using a shield mask pattern including the display area shield pattern and no peripheral area shield pattern. The order of the steps may be reversed.

The actual process conducted by the inventor provided a thickness of around 1.0 μm to the RGB color filter patterns prepared from a photosensitive resist by a typical pigment-dispersion technique and having a NTSC ratio of around 40%.

The actual process included the step of polishing the surface of the CF substrate to selectively remove unnecessary convex portions. This step may be conducted depending on the necessity in consideration of the state of surface of the CF substrate and the image quality required. Subsequently, the process included the steps of applying transparent to liquid resin having a photosensitive or thermally-curable property onto the entire surface by using a spin-coater, curing the resultant film in an oven to obtain an overcoat film. If the photosensitive resin is used, exposure and development steps should follow the coating of the liquid resin. The overcoat film thus obtained was around 1 μm thick. The step difference in the vicinity of the pile of three color filter layers was 0.8 μm due to the smaller-sized patterns, which is likely to be subjected to leveling.

Another photosensitive resin was then applied using a spin coater, followed by drying under a reduced ambient pressure, pre-baking, exposing the resultant film to light, development, washing and post-baking to form photoresist spacers (columnar spacers).

In the present embodiment, spacers are provided which support the cell gap outside the effective opening of the pixel and does not enter the effective opening. Preferable material for the spacers is a photosensitive material. The photoresist spacers may be provided in the vicinity of the R-color pattern, G-color pattern or B-color pattern depending on the desired structure. The photoresist spacers may be preferably provided on the first shield section including a pile of two color-filter layers and shielding the gate lines.

The photoresist spacers in association with the step difference formed by the color filter layers provides a suitable cell gap of the LC layer. The setting of the cell gap was 3.0 to 4.0 μm in this embodiment.

On the other hand, the TFT substrate was prepared to include therein TFTs as the active devices and operate the LCD unit in an in-plane switching mode. The TFT substrate has a structure wherein the area right over the channel of the TFT is provided with the TFT shield pattern obtained by forming a plurality of color filter layers on the CF substrate. The TFT substrate includes thereon a common electrode overlapping at least a part of the gate bus lines, and the common electrode has a window opening exposing the channel of the TFT. The edge of the window openings of the common electrode is located radially inward of the edge of the opaque electrodes configuring the TFT.

The process then included the step of forming an orientation film by coating each of the CF substrate and TFT substrate, followed by a rubbing treatment thereof.

A seal member was then formed by coating one of the substrates, followed by stacking both the substrates one on another to bond the same together. The gap of the panel obtained by bonding together both the substrates was then provided with a LC layer by injection of LC through an injection opening, which is then clogged to encapsulate the LC layer. In an alternative, a dropping technique may be used that includes disposing a droplet of LC on one of the substrates before bonding both the substrates.

The LC panel obtained by injection of the LC in the panel was then provided with a pair of polarizing films on both the surfaces of the LC panel, a backlight module, and interconnections such as signal lines and power source lines to obtain the final LCD unit. In the present embodiment, the TFT substrate is similar to that of the LCD unit described in Patent Publications JP-2000-89240A and JP-2004-62145A operating in an IPS-mode, wherein drain bus lines and gate bus lines are covered by an overlying common electrode. The LCD unit of the present embodiment may be either of a normally black mode or a normally white mode. The LCD unit obtained by the present embodiment may be of a VA (vertical aligned)-mode, IPS-mode or FFS (fringe-field-switching)-mode, for example.

It is to be noted that the process as described above is only an example, and the order of forming the RGB color filter layers may be selected as desired. A preferred order of forming the color filter layers is B, R and G or R, B and G, if a resist liquid is used for forming the color filter layers. This is because the color filter layers formed later is likely to have a smaller thickness due to the leveling of the color filter layers caused by the step difference. As an exemplified configuration, if the RGB color filter layers have a designed thickness of 1.0 μm at the effective opening area of the pixel, a pile of the three color filter layers may have a thickness of 1.0 μm at the first-layer color filter layer, 0.8 μm at the second-layer color filter layer and 0.7 μm at the third-layer color filter layer, the order of the layers being numbered from the bottom layer. This thickness configuration in fact depends on the viscosity and characteristic of the color filter layers itself. The smaller thickness raises the transmission factor, to reduce the optical density of the two- or three-color-layer shield pattern. In this respect, R-color pattern and B-color pattern are particularly important to obtain the higher optical density. Thus, R- and B-color patterns are preferably formed prior to the G-color pattern to assure the designed thickness of the shield section to achieve the higher optical density.

The optical density (optical density) of a R/B-piled shield pattern that represents the shield performance thereof is relatively low as compared to the shield pattern configured by resin carbon black or metal-oxide black matrix member generally used heretofore. For example, the resin carbon black has an optical density of 3.8 to 4.0, whereas the R/B-piled shield pattern having a thickness of 3.8 μm has an optical density of 3.0 to 3.5 in the color specification of design for NTSC ratio of 72%, and has an optical density as low as around 2.0 to 3.0 in the color specification of design for an NTSC ratio of 40%.

In a typical normally-black-mode LC panel such as an IPS-mode, an electric-field shield structure is provided on the drain lines and gate lines formed on the TFT substrate, whereby the LC is not driven in the area of the electric-field shield pattern. Thus, the polarizing films can block the light transmitted from the backlight source. In addition, the metallic lines in the area other than the effective opening area also contribute to blocking of the light. Reflected light generated by reflection of the external light as by metallic lines and electrode is well attenuated to have a lower optical strength. It is to be noted however that the color-piled shield section disposed in the TFT area preferably includes a color filter layer that effectively cuts the light in the longer wavelength range which especially causes the leakage light, as described in Patent Publication-1. In this view point, red color layer is provided in this color-piled shield section in the present embodiment.

As described heretofore, the CF substrate of the present embodiment has a sufficient light shield function even in an application where a higher luminance of the backlight is required or an external light having an extremely larger optical intensity is incident onto the CF substrate. Thus, even a configuration wherein the shield section of the CF substrate is configured by a pile of two adjacent color filter layers may provide a relatively higher image quality.

In addition, since the arrangement of the metallic lines in the TFT area cannot completely block the light from the backlight source, the three-color-piled shield section having a higher light-shield capability is provided in the TFT area in the configuration of the present embodiment, in order to block the external light incident onto the TFT. This achieves a higher light shield function and thereby provides a LCD unit having a higher image quality.

The pile of three color filter layers in the present embodiment may cause a larger step difference; however, one of the color filter layers can be removed therefrom to provide a pile of two color filter layers in the TFT area having a width smaller than the width of the interconnections, to reduce the step difference. In this configuration, as shown in FIG. 2, the width α of the second-layer color filter pattern 22b is larger than the width β of the overlying third-layer color filter pattern 22c, for alleviating the slope of the step difference. In addition, since the area of the top portion of the step is reduced as compared to the area of the case where both the color filter layers have the same width, to reduce the influence by the step difference in the rubbing treatment.

In an environment where the LCD unit is subjected to a lower intensity of the external light, the second shield section shielding the TFT area may have a smaller area that shields only the channel of the TFT. This further reduces the area of the top portion of the step. In this case, the term "TFT area" includes only the channel of the TFT.

The configuration wherein the second shield section including a pile of three color filter layers has a requisite minimum area reduces the resistance factor that prevents spreading of the LC during an injection process or dropping process for providing a LC layer in the panel. This improves the uniformity of the LC layer and provides a LCD unit having a higher image quality.

The configuration wherein the second shield section including a pile of three color filter layers is provided only for the TFT area assures, as shown in FIG. 3, a larger area of the first shield section including a pile of two color filter layers in which the photoresist spacers 31 are arranged, as compared to the structure shown in Patent Publication-1. This increases the design choice in the arrangement of the photoresist spacers to adjust the LC gap with ease. Thus, the LCD unit may have a smaller gap without a difficulty in adjustment of the cell gap.

Assuming that R, G and B color filter layers are each 1.0 μm thick and the overcoat film is 1.0 μm thick, the step difference between the pile of three color filter layers and the effective opening is around 0.8 µm, and the step difference between the pile of two color filter layers and the effective opening is around 0.4 µm. If the cell gap is as small as 3.0 µm in this case, the thickness or height for the photoresist spacers disposed on the first shield section (pile of two color filter layers) is 2.6 µm, which is more desirable as compared to the case where the photoresist spacers are arranged in the area of the pile of three color filter layers and thus the assured thickness is only 2.2 µm. A larger thickness of the photoresist spacers provides a larger expected amount of deformation in the design of the photoresist spacers, and thus allows a larger margin for deformation of the photoresist spacers that responds to the stress of the external pressure applied to the display screen, whereby a local gap defect can be reduced. The larger expected amount of adjustment in the thickness of the photoresist spacers increases the design choice in the design of the cell gap of the LCD unit.

Second Exemplary Embodiment

Figure 6:
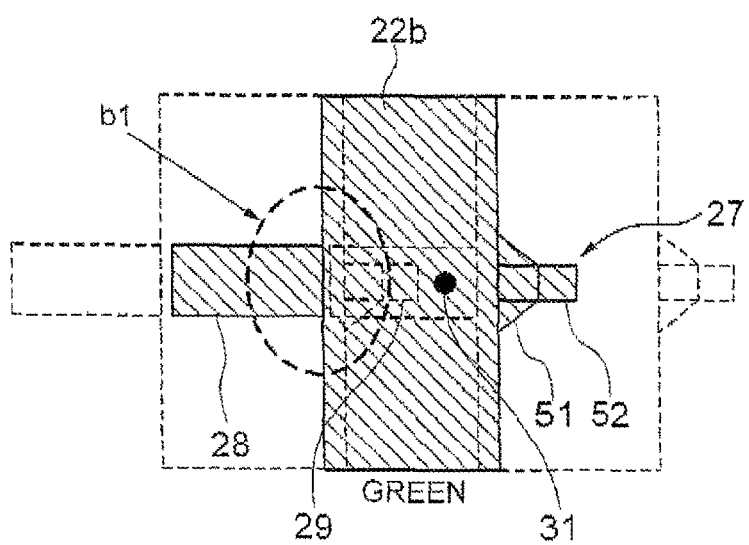
FIG. 6 is a top plan view showing the G-color layer of the light shield member of FIG. 5.

FIGS. 5 and 6 show the second shield section that shields the TFT area in a CF substrate according to a second exemplary embodiment of the present invention. The second shield section in the present embodiment is such that the shape of the smaller-sized extension pattern 27 is changed from that in the first exemplary embodiment. The other configurations in the present embodiment are similar to those in the first exemplary embodiment.

Figure 7:
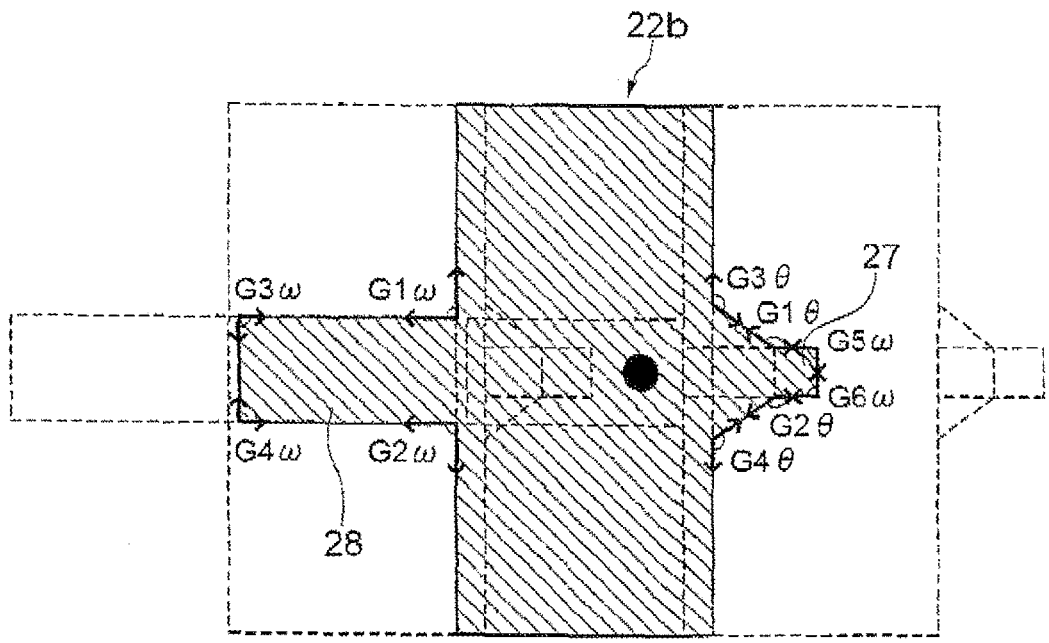
FIG. 7 is an explanatory diagram showing corner angles of the light shield member shown in FIG. 6.

More specifically, the smaller-sized extension pattern 27 has a tapered base portion 51 and a constant-width distal portion 52. The tapered base portion 51 reduces in the width thereof as viewed in the extending direction of the extension pattern 27 and configures part of the second shield section 29 that shields a vicinity of the TFT area. The constant-width distal portion 52 extends from the tapered base portion 51 and configures part of the second shield section 29 that shields the TFT area. FIG. 7 shows the shape of the pair of extension patterns 27, 28 of the G-color filter layer 22*b* in the second embodiment, defining the corner angles $G1\theta$ to $G4\theta$ and $G1\omega$ to $G6\omega$ of the extension patterns.

The range of angles $G1\theta$ to $G4\theta$ is determined as follows:

90 degrees $\leq G1\theta$ to $G4\theta \leq 180$ degrees.

The range of angles $G1\omega$ to $G6\omega$ is also determined as follows:

90 degrees $\leq G1\omega$ to $G6\omega \leq 180$ degrees.

However, the shape of the effective opening area and effective opening ratio of the pixel is restricted by the above angles $G1\omega$ to $G6\omega$. Thus, it is preferable that angles $G1\omega$ to $G6\omega$ be roughly 90 degrees. If a rubbing defect occurs in this range of angles $G1\omega$ to $G6\omega$, the width of the extension patterns may have a taper that reduces in the direction extending from the base of the extension patterns. R- and B-color patterns may have a configuration similar to that of the G-color pattern shown in FIG. 7, and may be formed by a process similar to that in the first exemplary embodiment.

Assuming that $\chi$ is the angle between the tapered side of the tapered base portion 51 and the rubbing direction 57 in the rubbing treatment of the CF substrate, the angle $\chi$ is preferably in the range of:

45 degrees $\leq \chi \leq 135$ degrees, for allowing the fiber tip of the rubbing cloth to sufficiently contact the tapered side of the tapered base section 51 for rubbing thereof.

Nevertheless, it is generally preferable that $\chi$ be around 90 degrees. In this case, the orientation of the LC layer is aligned with the rubbing direction.

Third Exemplary Embodiment

Figure 8:
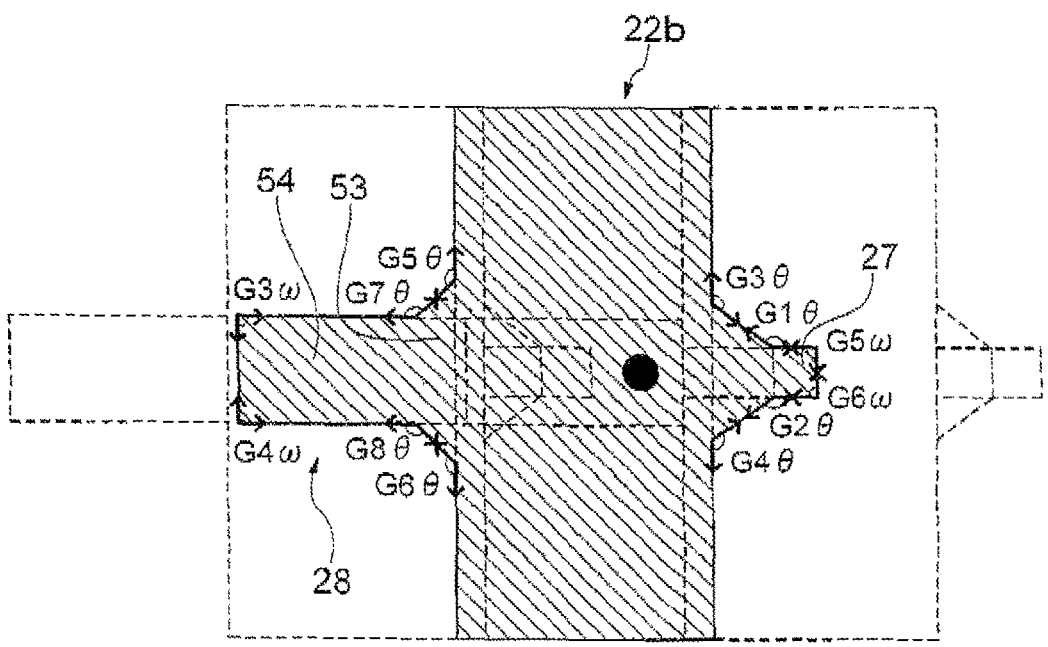
FIG. 8 is an explanatory diagram showing, similarly to FIG. 7, the corner angles of a light shield member in a CF substrate according to a third exemplary embodiment of the present invention.

FIG. 8 shows the pattern of the shield section shielding the TFT area and the vicinity thereof in a CF substrate according to the third exemplary embodiment. This pattern is obtained by modifying a portion of the pattern encircled by a dotted line b1 shown in FIG. 6. Except for this configuration, the CF substrate of the present embodiment is similar to the CF substrate of the second exemplary embodiment.

In FIG. 8, the larger-sized extension pattern 28 has also a tapered base portion 53 and a constant-width distal portion 54, similarly to the smaller-sized extension pattern 27. This configuration allows the fiber tip of the rubbing cloth to well contact the tapered base portion 53 and the vicinity thereof in the second shield section including a pile of three color filter layers. FIG. 8 shows angles $G1\theta$ to $G8\theta$ and $G3\omega$ to $G6\omega$ that correspond to respective angles of the smaller-sized extension pattern 27.

The angles $G1\theta$ to $G8\theta$ may be in the range of:

90 degrees $\leq G1\theta$ to $G8\theta \leq 180$ degrees. The constant-width distal portion 54 shields the TFT area and extends beyond the far edge of the TFT area to shield the photoresist pattern 31.

Nevertheless, it is preferable that the angles $G1\theta$ to $G8\theta$ be around 90 degrees because these angles restrict the effective opening area and effective opening ratio of the pixel. If a rubbing defect occurs in this case, the angles may be increased from 90 degrees to configure a tapered base portion even if it reduces the effective opening area.

Fourth Exemplary Embodiment

Figure 9:
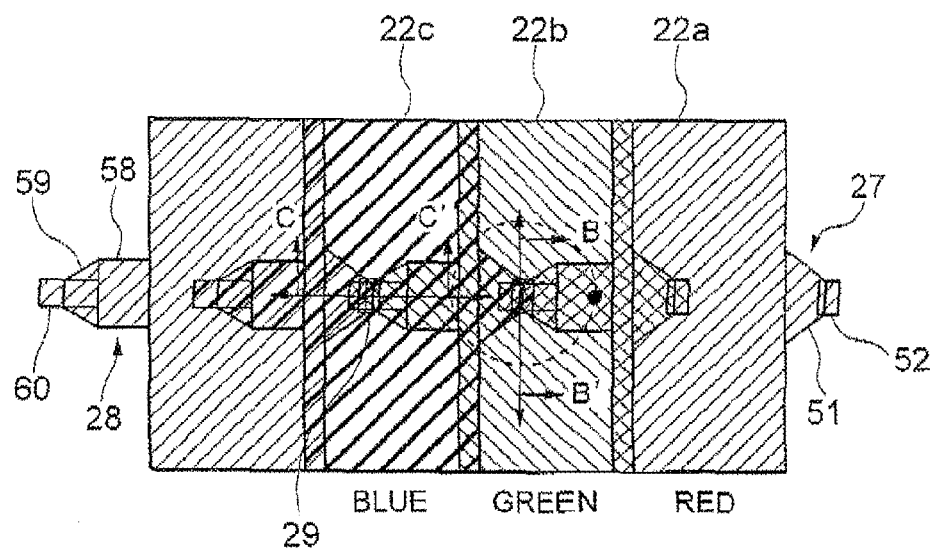
FIG. 9 is a top plan view of the light shield member for shielding the TFT area in a CF substrate according to a fourth exemplary embodiment of the present invention.
Figure 10:
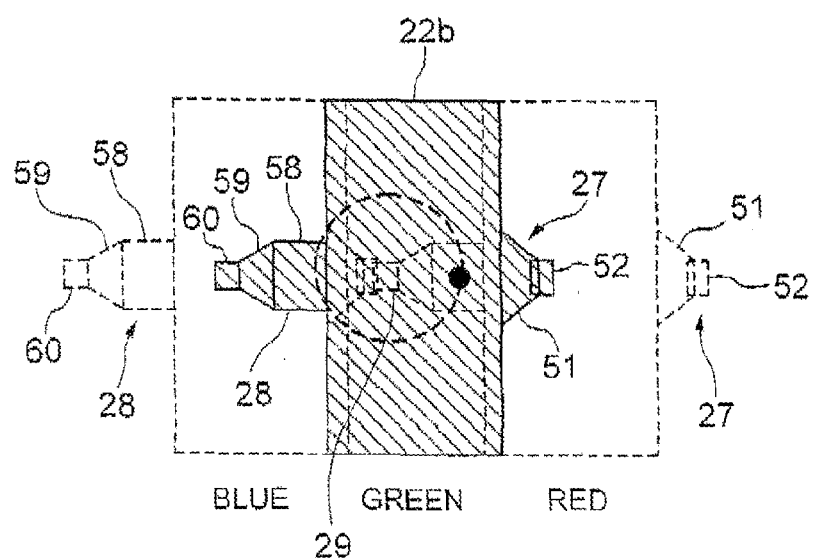
FIG. 10 is a top plan view of the G-color layer of the light shield member of FIG. 9.

FIGS. 9 and 10 show the pattern of the second shield section shielding the TFT area an the vicinity thereof in a CF substrate according to the fourth embodiment.

In FIGS. 9 and 10, the light shield member includes a second shield section having a substantially minimum area for shielding the TFT area against the external light. In the configuration depicted therein, each color filter layer includes a stripe pattern, a smaller-sized extension pattern 27 including a tapered based portion and a constant-width distal portion, and a larger-sized extension pattern 28 including a constant-width base portion 58, tapered intermediate portion 59 and a constant-width distal portion 60. The constant-width distal portion 52 of the smaller-sized extension pattern 27 of each color filter pattern (for example B-color pattern 22*c*) overlaps the constant-width distal portion 60 of the larger-sized extension pattern 28 of another color filter pattern (R-color pattern 22*a*), to configure the second shield section 29 including a pile of three color filter layers. In this embodiment, the second shield section 29 has a substantially minimum area that is isolated from the stripe pattern. Other configurations of the present embodiment are similar to those of the second embodiment.

Figure 11:
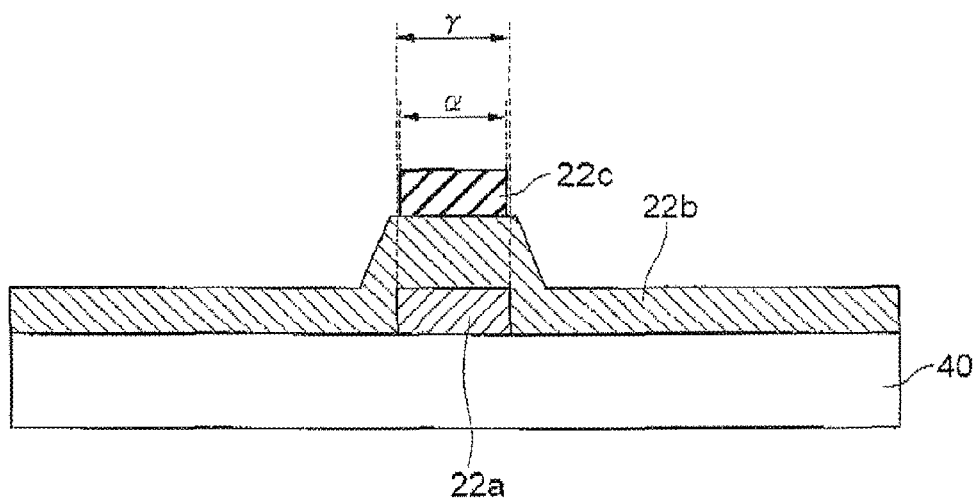
FIG. 11 is a sectional view taken along line B-B' in FIG. 9.
Figure 12:
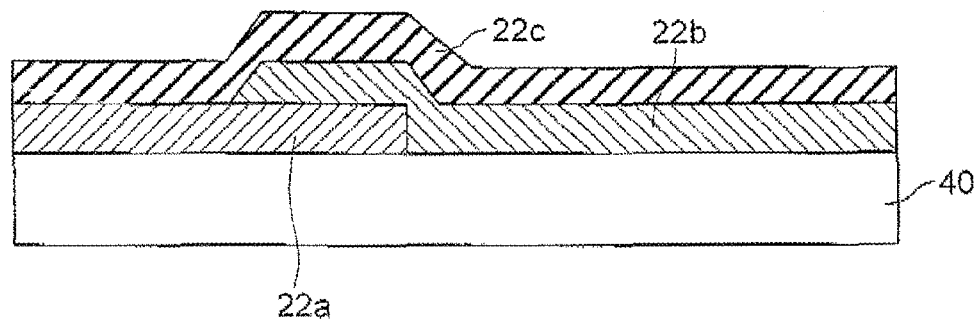
FIG. 12 is a sectional view taken along line C-C' in FIG. 9.

FIGS. 11 and 12 show sectional views taken along lines B-B' and C-C', respectively, in FIG. 9. In FIG. 11, dimension $\alpha$ is the width of the second shield section 29 (FIG. 9) configured by the smaller-sized extension pattern 27 of the B-color pattern 22*c*, dimension $\gamma$ is the width of the larger-sized extension pattern 28 of the R-color pattern 22*a*. Dimensions $\alpha$ and $\gamma$ have an equal design dimension and may have a small difference therebetween caused by process conditions. In FIG. 12, the length of overlapping of the constant-width distal portion 60 of the larger-sized extension pattern 28 of the B-color pattern 22c and the constant-width distal portion 52 of the smaller-sized extension pattern 27 of the R-color pattern 22a configure the second shield section 29 that has a substantially minimum requisite length for shielding the channel of the TFT.

Fifth Exemplary Embodiment

In the configuration of the first through fourth exemplary embodiments, a single exposure mask is used for patterning the three color filter layers. The fifth exemplary embodiment is such that two color filter layers are patterned using a common mask (first mask), and another color filter layer is patterned using another mask (second mask).

Figures 14A, 14B, 14C:
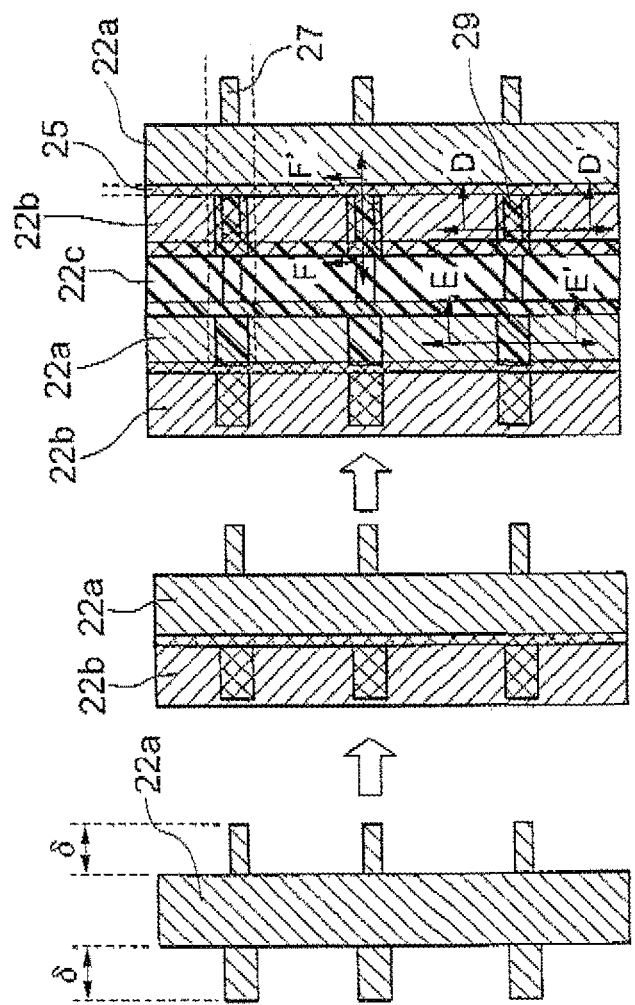
FIGS. 14A to 14C are top plan views showing a color filter in consecutive steps of fabrication of the CF substrate of the fifth embodiment.
Figure 15:
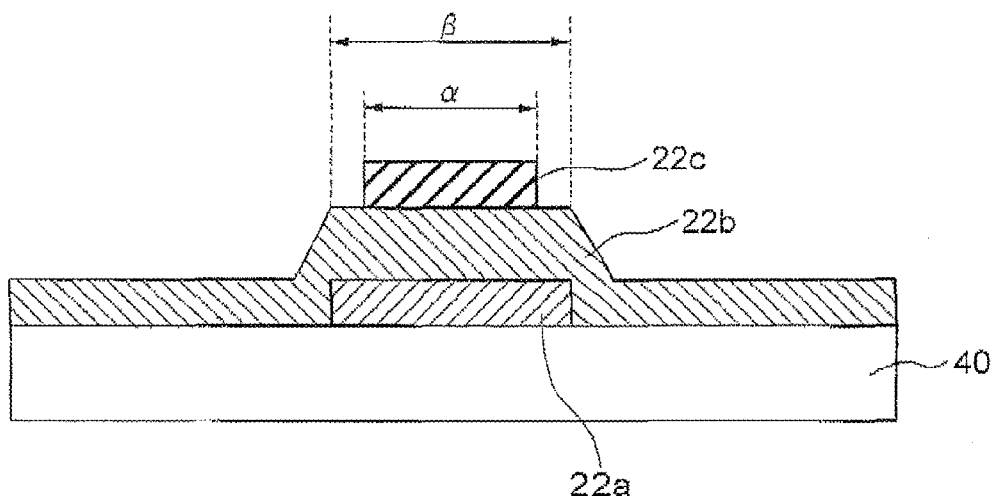
FIG. 15 is a sectional view taken along line D-D' in FIG. 14C.
Figure 16:
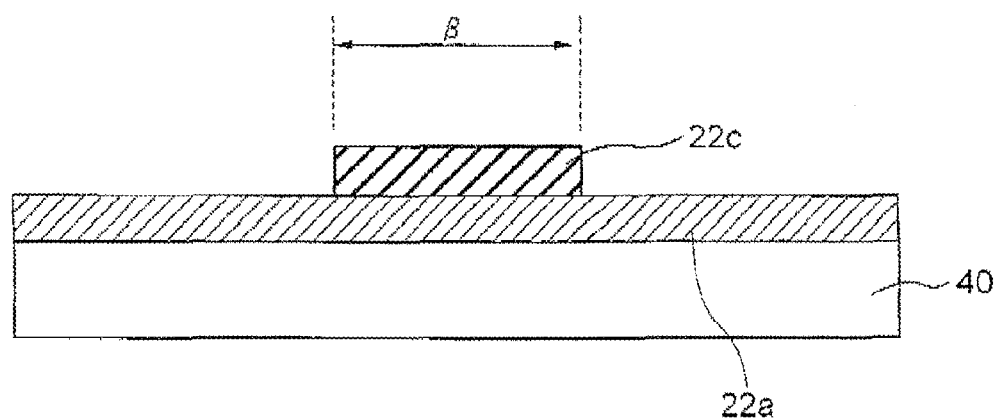
FIG. 16 is a sectional view taken along line E-E' in FIG. 14C.
Figure 17:
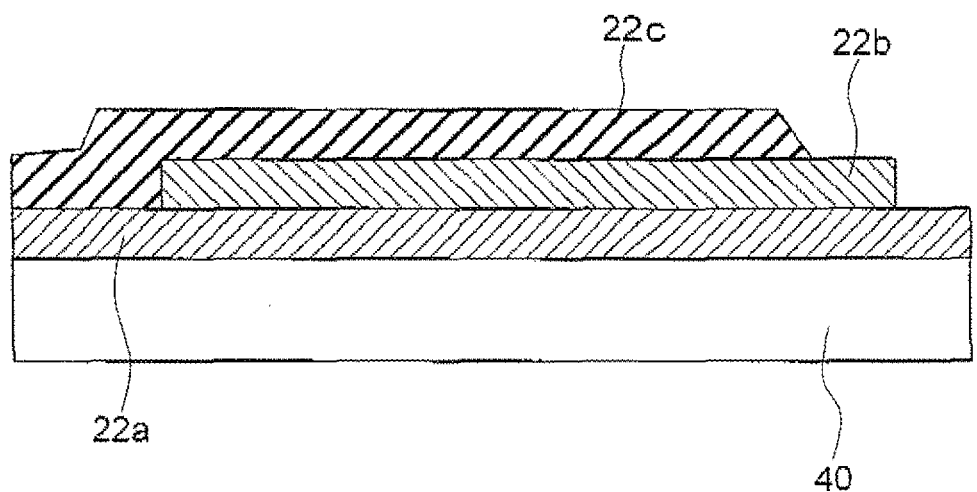
FIG. 17 is a sectional view taken along line F-F' in FIG. 14C.

FIGS. 13A to 13C show steps of a process using the first and second masks for patterning three color filter layers, whereas FIGS. 14A to 14C show the same process to consecutively show the patterns obtained in the consecutive three steps, similarly to FIGS. 1A to 1C. FIGS. 15, 16 and 17 show sectional views taken along lines D-D', E-E' and F-F', respectively, in FIG. 14C. The configurations other than the mask in the present embodiment is similar to those in the first exemplary embodiment.

The first mask used for patterning the R- and B-color filter layers 22a, 22c includes a stripe pattern and a pair of extension patterns 27, 28 having the same length corresponding to the width of the stripe pattern and yet different widths, whereas the second mask used for patterning the G-color filter layer 22b includes a stripe pattern without any extension pattern. In this configuration, the first shield section 25 includes a first portion (stripe pattern) that shields the drain lines (signal lines) and configured by a pile of two adjacent color filter layers, and a second portion that shields the gate lines and configured by R- and B-color filter layers 22a, 22c. More specifically, the stripe pattern of the G-color pattern 22b overlaps the extension patterns of the other two color filter layers 22a, 22c to configure the second shield sections 29, whereas the stripe patterns of the other color filter layers overlaps the extension pattern of another color filter pattern, to configure a third shield section that includes a pile of two color filter patterns and shields the TFT area in the area of the stripe patterns of the R- and B-color patterns. This structure reduces the area of the second shield section including a pile of three color filter layers. However, since the TFT area is shielded by a pile of two color filter layers in the area of the stripe patterns of the R- and B-color patterns, the shield function of this area is somewhat reduced. This structure provides a substantially minimum area for the second shield section including a pile of three color filter layers, and will increase the cost for the mask.

Sixth Exemplary Embodiment

Figure 18:
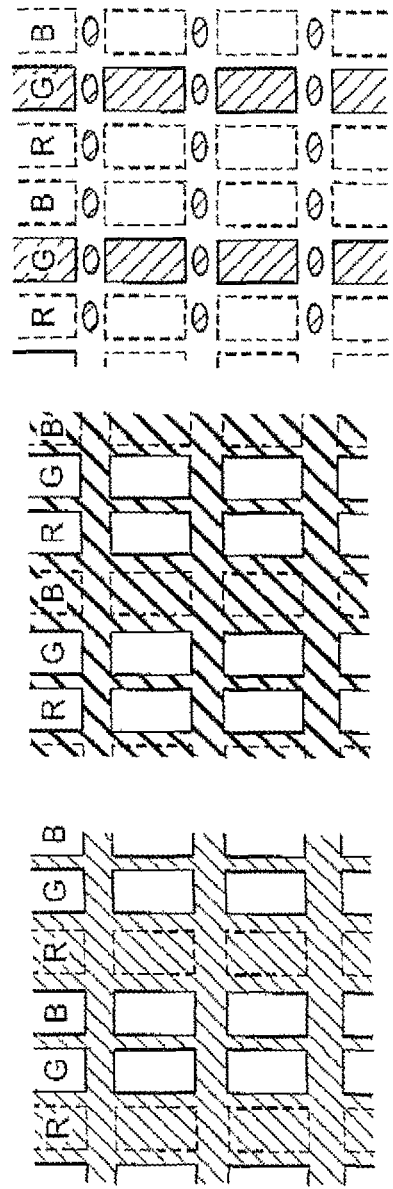
FIGS. 18A to 18C are top plan views showing a color filter in to consecutive steps of fabrication of a CF substrate according to a sixth example the present invention.
Figure 19:
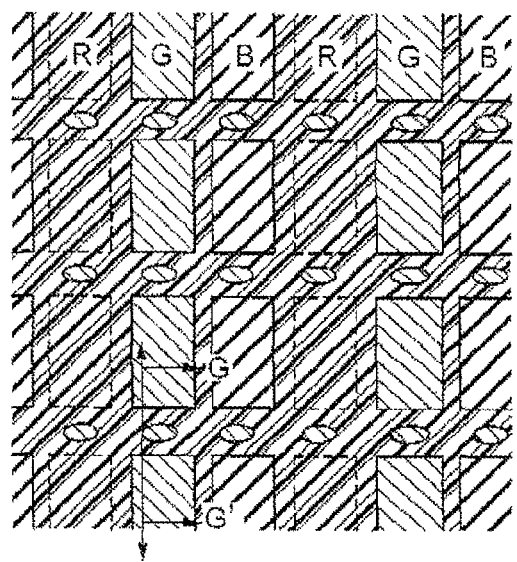
FIG. 19 is a top plan view of the color filter in the CF substrate of the sixth example.

In this sixth exemplary embodiment, three color filter layers are patterned using three different masks. FIGS. 18A to 18C consecutively show this process using the three different masks, similarly to FIGS. 13A to 13C, respectively, and FIG. 19 is a top plan view showing the final structure obtained by the process. In FIG. 18A, the mask for R-color filter layer has a lattice structure including two types of stripe pattern having a larger width and a smaller width and alternately disposed. The stripe pattern having a smaller width is provided on the boundary between the area of the G-color filter layer and the area of the B-color filter layer. In FIG. 18B, the mask for the B-color filter layer has a lattice structure including two types of stripe pattern having a larger width and a smaller width, wherein the smaller-width pattern is disposed alternately with the larger-width pattern. In FIG. 18C, the mask for the G-color filter layer includes two types of isolated pattern including an insolated pattern for the effective opening area and another isolated pattern for the second shield section that shields the TFT area.

Figure 20:
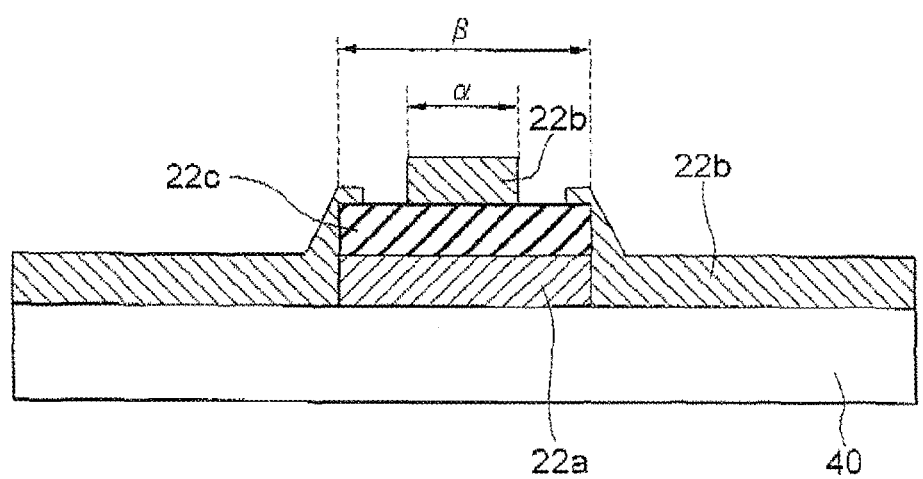
FIG. 20 is a sectional view taken along line G-G' in FIG. 19.
Figure 21A:
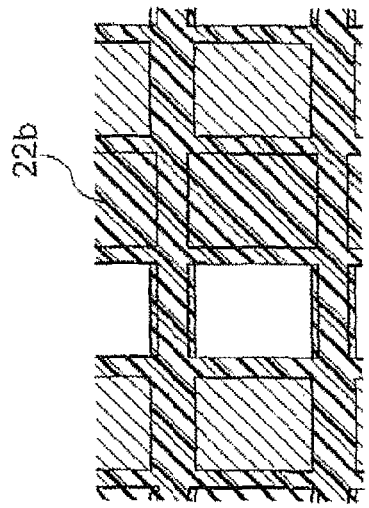
FIGS. 21A to 21D are top plan views showing a color filter in consecutive steps of fabrication of a CF substrate described in a publication.
Figure 21B:
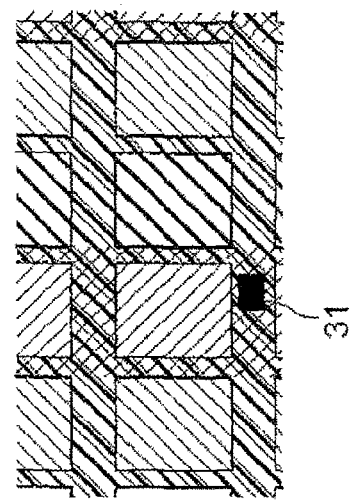
Figure 21C:
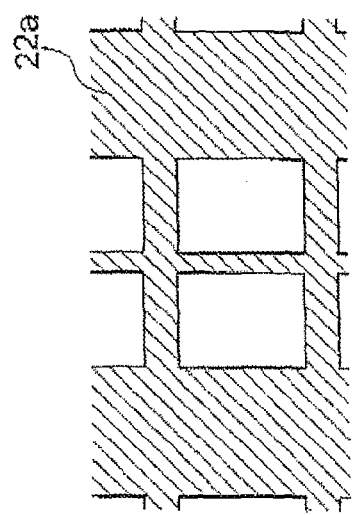
Figure 21D:
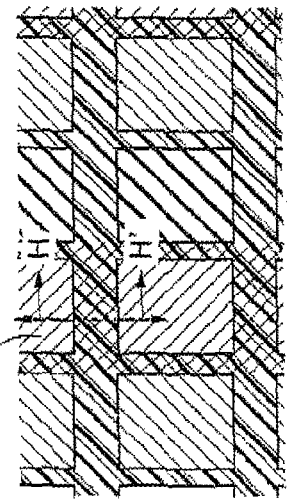
Figure 22:
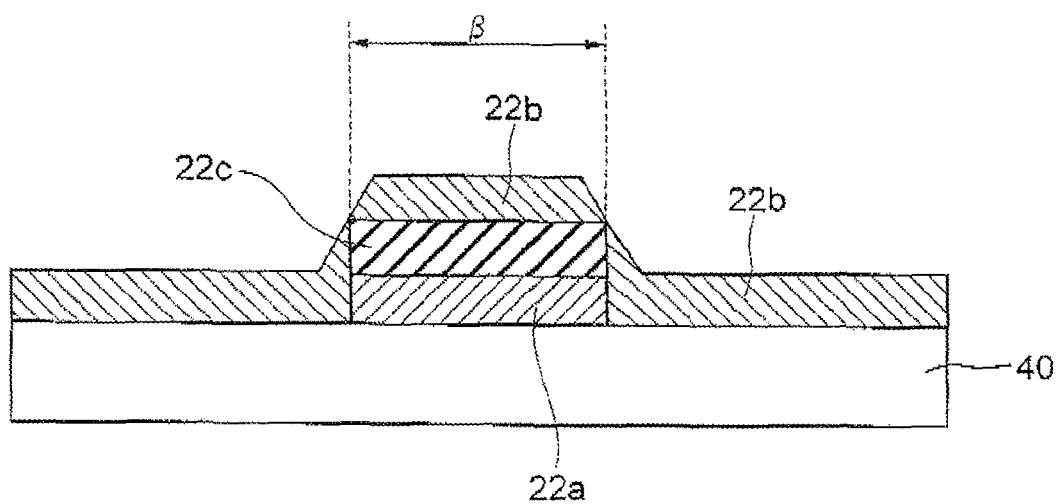
FIG. 22 is a sectional view taken along line H-H' in FIG. 21C.
Figure 23:
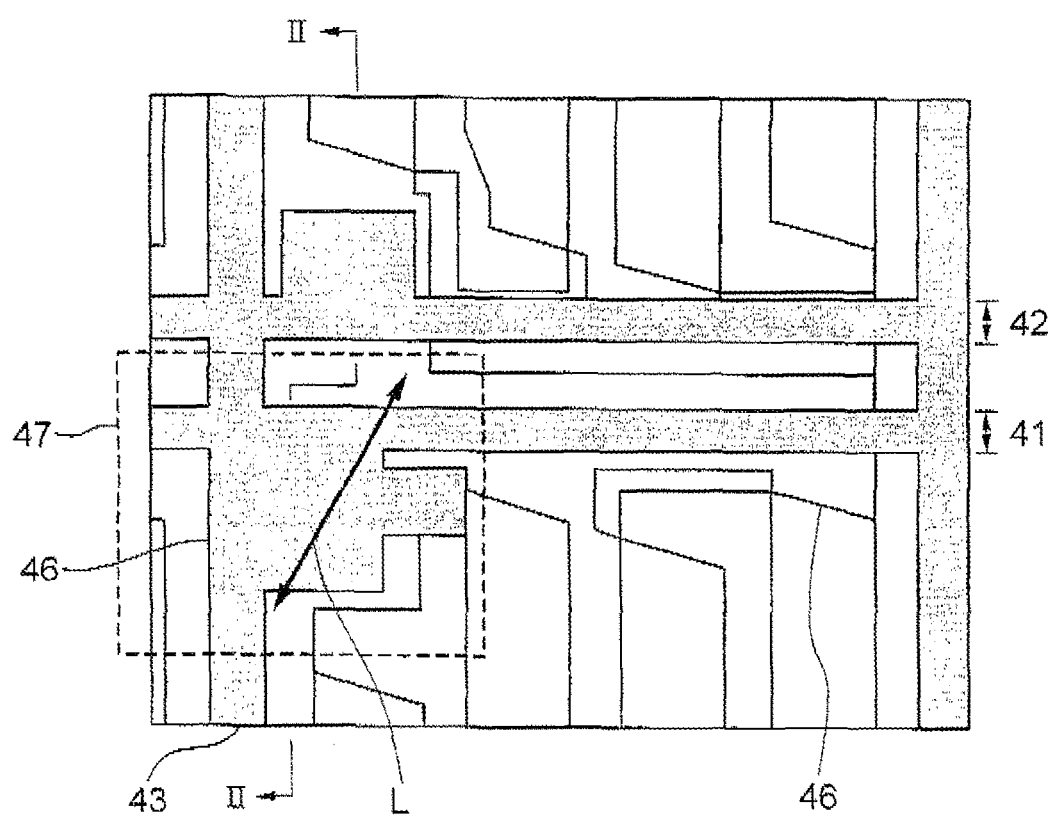
FIG. 23 is a top plan view of a TFT substrate described in another publication.
Figure 24:
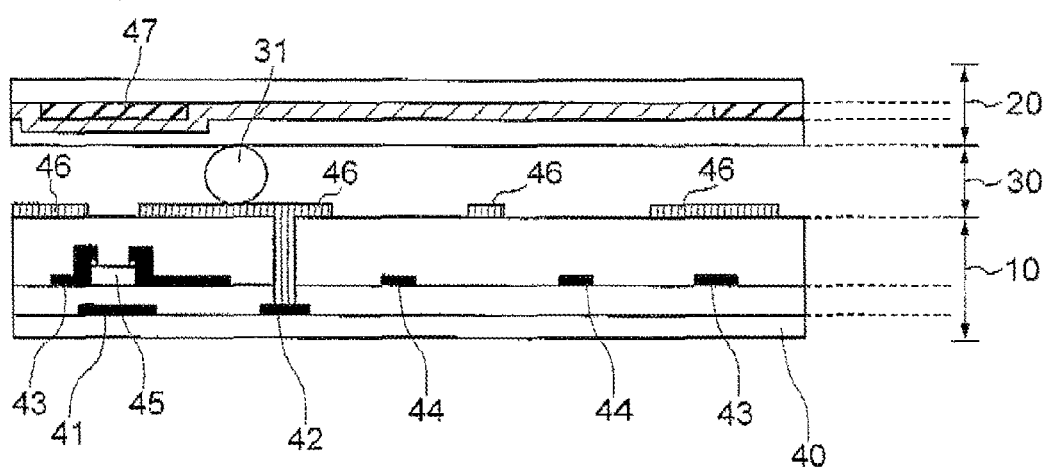
FIG. 24 is a sectional view taken along line II-II' in FIG. 23.
Figure 25:
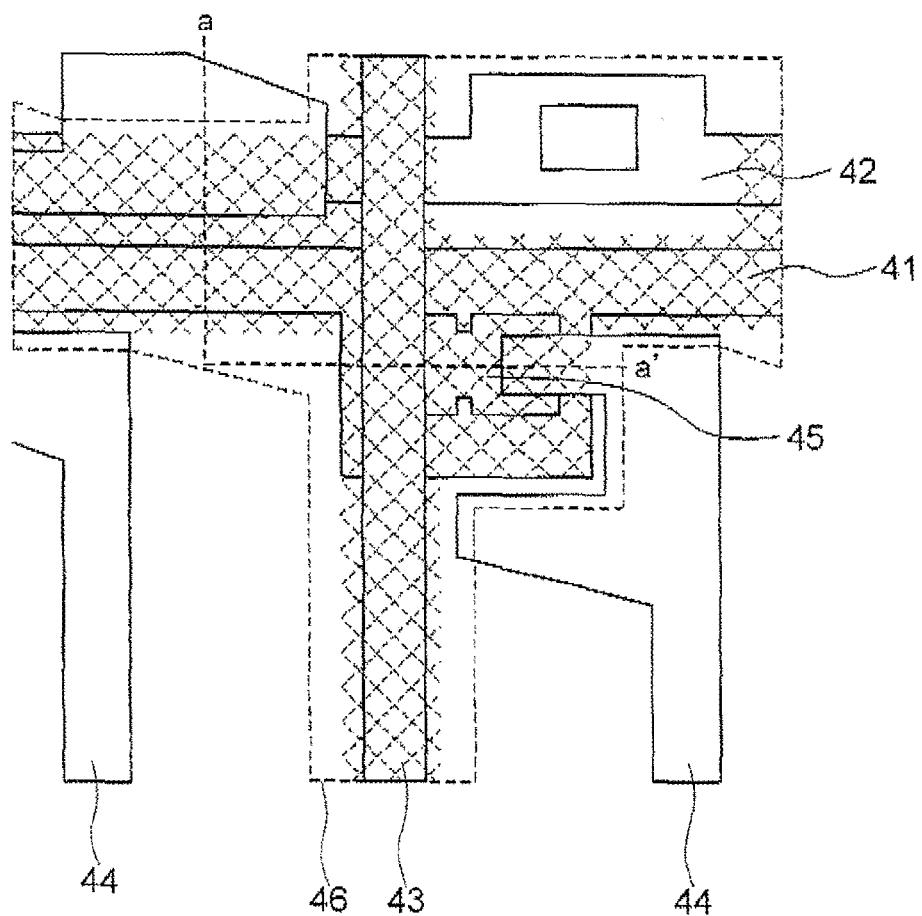
FIG. 25 is a top plan view of the TFT substrate described in the another publication.

FIG. 20 shows a sectional view taken along line G-G' in FIG. 19, showing the final structure of the color filter. The other configurations in the present embodiment are similar to those in the first exemplary embodiment.

The configuration wherein R-, G- and B-color filter layers are patterned using different exposure masks provides a wider range of design choice in the patterning of the color filter layers. In the color filter of the present embodiment, the gate lines and data lines are shielded by a pile of tow color filter layers, i.e., R- and B-color filter layers, whereas the TFT area is shielded by the pile of R- and B-color filter layers and the isolated pattern of the G-color filter layer. The configuration wherein the drain lines and gate lines are shielded by a pile of the R- and B-color filter layers provides a higher shield function as compared to the case of a pile of two color filter layers including a G-color filter layer. The different exposure masks may raise the cost for the CF substrate to some extent. Although the CF substrate of the present embodiment includes an isolated pattern, the isolated pattern is provided on the glass substrate with an intervention of another color filter layer. Thus, the possibility of peel-off is lower in the present embodiment as compared to the case where the isolated pattern is directly formed on the glass substrate. It is preferable that the isolated pattern have a width of 10 μm or above in the present embodiment, and a width of 20 μm is more preferable.

Seventh Exemplary Embodiment

Figure 26:
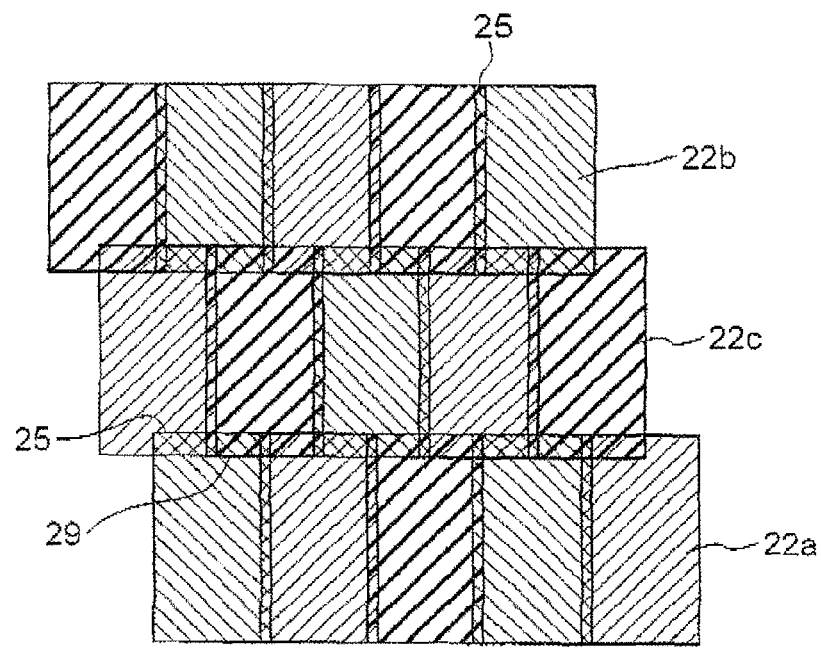
FIG. 26 is a top plan view of a color filter having a delta arrangement in a color filter substrate according to a seventh exemplary embodiment of the present invention.

The CF substrate of the first through sixth exemplary embodiments is such that each color filter layer includes a stripe pattern extending in the column direction of the array of pixels. FIG. 26 shows the configuration of the CF substrate according to the seventh exemplary embodiment of the present invention, wherein the color filter patterns corresponding to respective pixel area are arranged in a delta (triangular) arrangement, i.e., without using a stripe pattern. It is to be noted that the CF substrate of the seventh embodiment may have a diagonal arrangement, rectangle arrangement, honeycomb arrangement, instead of the delta arrangement shown in FIG. 26, although the delta arrangement is exemplified herein. It is also to be noted that the effective opening of the pixel may be of a roughly circular, elliptical or hexagonal shape instead of the square or rectangular shape in the previous embodiments.

Figure 27:
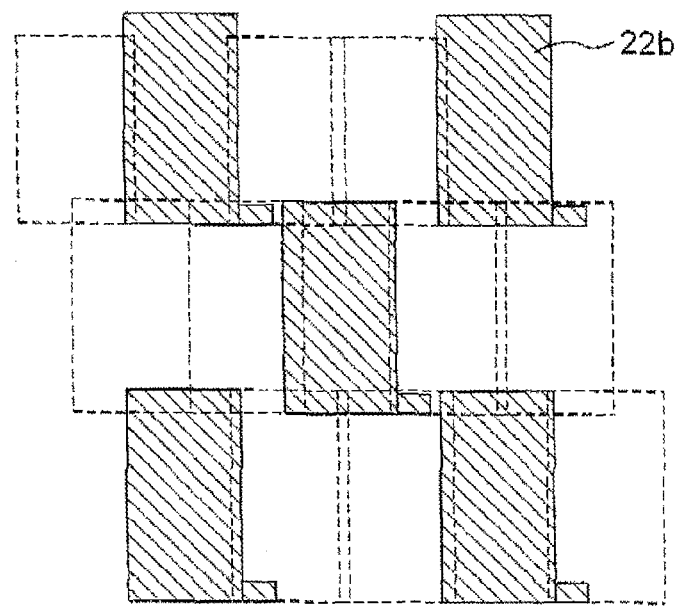
FIG. 27 is a top plan view of the G-color layer of the color filter of FIG. 26.
Figure 28:
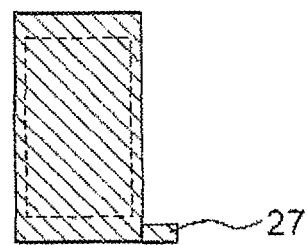
FIG. 28 is a top plan view of the basic pattern of the color filter in a CF substrate according to a seventh exemplary embodiment of the present invention.

FIG. 28 shows the basic shape of each color filter pattern that includes a rectangular pattern and an extension pattern 27 extending from the rectangular pattern. FIG. 27 shows arrangement of the color filter patterns of a single color, and FIG. 26 shows the overall arrangement of the color filter patterns 22a, 22b, 22c in the final color filter. The TFT area is shielded by the second shield section 29 including a pile of adjacent three color filter patterns 22a, 22b, 22c. The data lines and gate lines are shielded by the first shield section including a pile of adjacent two color filter patterns out of the three color filter patterns 22a, 22b, 22c. In the present embodiment, most part of the light shield member is configured by the first shield section 25, and the TFT area is shielded by the second shield section 29 including a pile of three color filter layers, whereby only a small area is needed by the second shield section 29. The mask providing the pattern of FIG. 27 can be used for patterning the three color filter layers, to reduce the cost for the mask.

Comparative Example

A CF substrate of a comparative example was manufactured which included a black matrix pattern including a pile of two R- and B-color filter patterns, and color filter patterns are provided for respective effective openings of the pixel, such as shown in FIG. 21. In the comparative example, three exposure masks were used. Other configurations of the comparative example were similar to those in the first exemplary embodiment. The pattern itself is close to the pattern of the sixth exemplary embodiment; however, the G-color stripe pattern overlies a pile of the R- and B-color filter patterns shielding the gate lines. The color filter in the comparative example has a larger area for the pile of three color filter patterns as compared to the color filter in the sixth embodiment, and the step difference formed by the pile of three color filter layers is nearer to the effective opening of the pixel, whereby an orientation defect caused by an insufficient rubbing treatment is likely to enter the effective opening area of the pixel. In addition, the pile of three color filter layers is only provided on the TFT area of the G-pixel. Thus, the comparative example is inferior to the above embodiment in the cost and the light shield performance.

Eighth Comparative Embodiment

Figure 37:
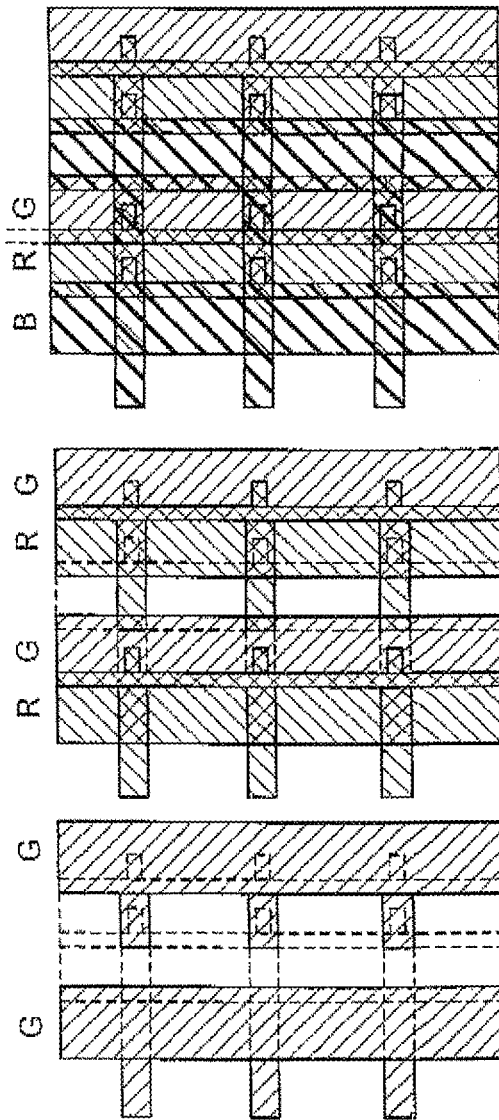
FIGS. 37A to 37C are top plan views showing a color filter in consecutive steps of fabrication of a CF substrate according to an eighth exemplary embodiment of the present invention.
Figure 38:
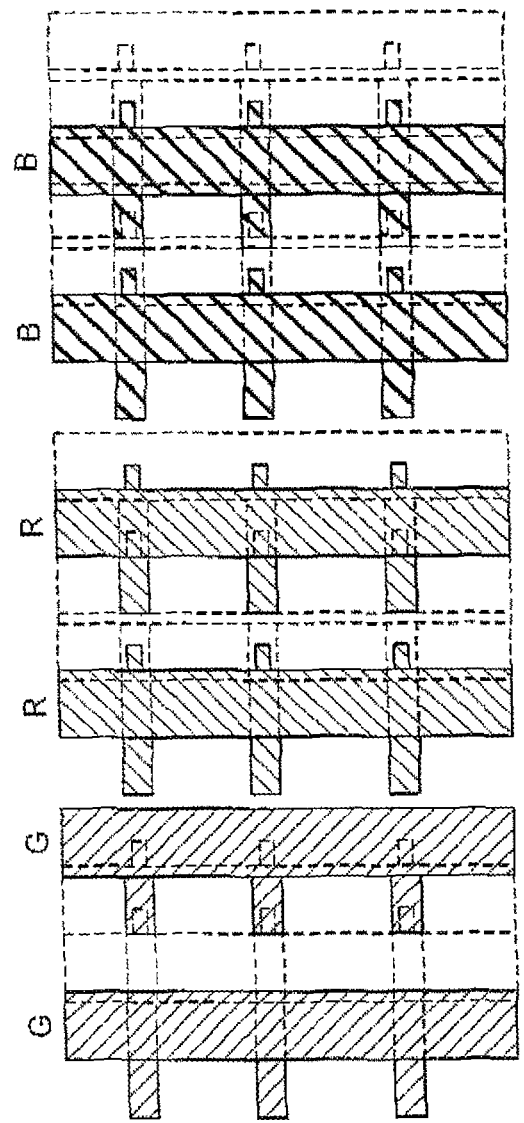
FIGS. 38A to 38C are top plan views showing respective color filter layers of the color filter in the eighth exemplary embodiment of the present invention.
Figure 39:
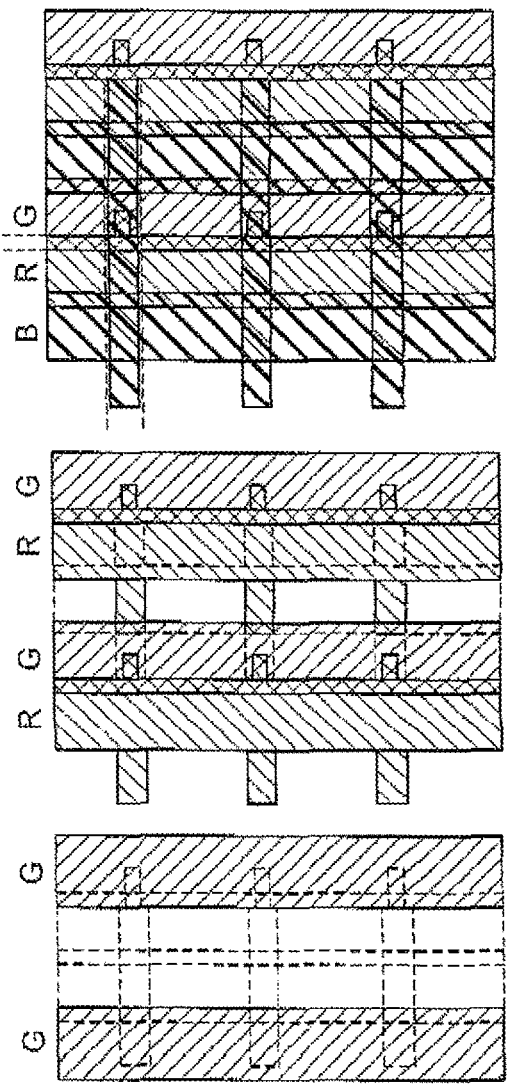
FIGS. 39A to 39C are top plan views showing a color filter in consecutive steps of fabrication of a CF substrate according to a ninth exemplary embodiment of the present invention.
Figure 40:
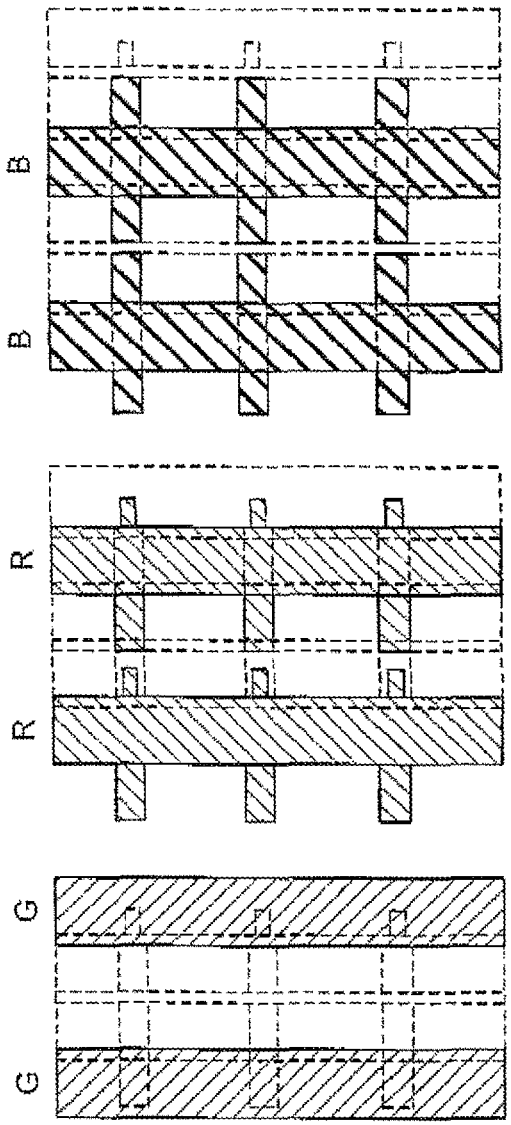
FIGS. 40A to 40C are top plan views showing respective color filter layers of the color filter in the ninth exemplary embodiment.
Figure 41:
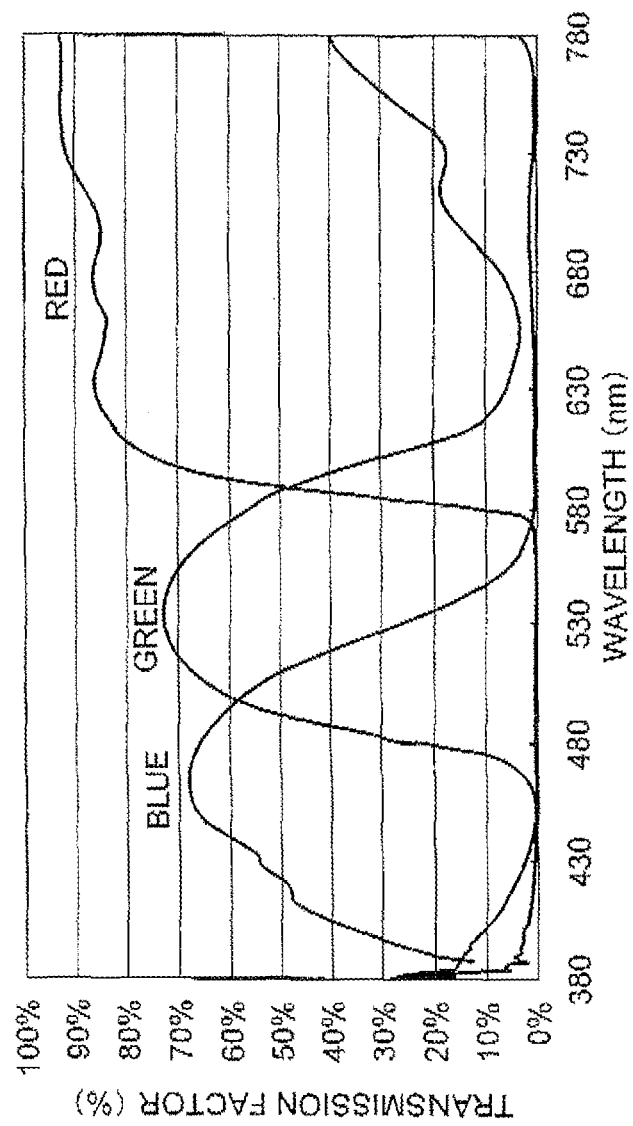
FIG. 41 is a spectral transmission diagram of the color filter layers of the color filter of an example.

FIGS. 37A to 37C show, similarly to FIGS. 1A to 1C, a color filter in a CF substrate according to the eighth embodiment of the present invention. FIGS. 38A to 38C show the steps of FIGS. 37A to 37C, respectively, for showing the respective color filter patterns in the respective steps. The color filter in the present embodiment is different from the first embodiment in the pattern of G-color filter layer. In the present embodiment, the R- and B-color filter layers are patterned using a common exposure mask, whereas the G-color filter layer is patterned using another exposure mask. The G-color pattern 22b is first formed, followed by consecutively forming the R- and B-color patterns. As understood from FIGS. 38A to 38C, the G-color pattern 22b includes a stripe pattern and a single extension (larger-sized extension) pattern, whereas the R- and B-color patterns includes a stripe pattern and a pair of extension patterns similar to those in the first embodiment.

The process for manufacturing the CF substrate of the eighth embodiment will be described hereinafter. A coloring compound for the G-color layer is first formed on a glass substrate by using a spin coater, followed by drying under a reduced ambient pressure, pre-baking, exposure to light by using a photoresist mask, developing, washing and post-baking the same to obtain the G-color pattern. Subsequently, the R-color pattern and B-color pattern are consecutively formed similarly to the process for the G-color pattern. The process itself is similar to that in the first embodiment.

The R- and B-color filter patterns 22a, 22c are similar to those in the first embodiment. The G-color pattern 22b formed as the first-layer pattern includes the stripe pattern and a single extension pattern, without including the extension pattern extending toward the TFT area, as will be understood from FIG. 37A and FIG. 38A.

Thus, as shown in FIG. 37C, the resultant light shield member includes a first shield section that includes a pile of two color filter layers and shields the gate lines and data lines, a second shield section that includes a pile of three color filter layers and shields the TFT area corresponding to the R- and G-color pixels, and a third shield section that includes a pile of two color filter layers and shields the TFT area corresponding to the B-color pixel.

The configuration that the light shield member includes first through third shield sections obtained by the specific G-color pattern formed as the first-layer color filter pattern provides improvement of the product yield as well as the uniformity of the image, as will be discussed hereinafter.

In the cleaning process of the color filter layers, if the pressure of the cleaning water or strength of the cleaning ultrasonic wave is increased in order to effectively remove the foreign particles from the CF substrate, there is a possibility that peel-off or partial removal of a part of color filter pattern occurs even in the case where the part of color filter pattern is an extension pattern extending from a stripe pattern. In particular, such a peel-off or partial removal is more likely to occur for the color filter pattern formed directly on the glass substrate as the first-layer pattern, as compared to the second- and third-layer color filter patterns.

The reason is that the color filter layer has a poor adhesive strength with respect to the glass substrate. In particular, a partial removal of the first-layer color filter pattern is likely to occur in the case of shifting the cleaning condition during the fabrication process. Further, development of the color filter layer may cause a negative-pattern photoresist film to have a reverse (staggered) tapered shape, whereby the contact area of the color filter pattern is reduced after the development. Thus, the pile of three color filter patterns having a smaller area is involved with such a peel-off or partial removal after the development step that further reduces the contact area.

The eighth embodiment uses, as the first-layer color filter pattern in contact with the glass substrate, the G-color pattern including a stripe pattern without an extension pattern for the TFT area. Thus, the color filter in the eighth embodiment has a lower possibility of occurring of the peel-off or partial removal thereof.

In the present embodiment, the configuration wherein the light shield member includes the second shield section including a pile of three or more color filter layers and the third shield section including a pile of color filter layers in number at least one less than the number of color filter layers in the second shield section in addition to the first shield section reduces the area of the pile of three or more color filter layers, to thereby reduce the area of the large step difference. This prevents occurring of an image defect due to misalignment of the LC layer that is generally caused by an insufficient rubbing treatment or attachment of particles generated by the rubbing treatment onto the step portion. In addition, the smaller area of the step portion on the color filter allows the LC layer to uniformly spread over the screen area during forming the LC layer by using an injection technique or dropping technique, thereby preventing a malfunction of the cell gap or insufficient injection of the LC to improve the image uniformity.

In a typical LCD unit, it is likely that particles generated during the rubbing treatment of the orientation film attaches onto the step portion of the orientation film to cause ununiformity of the orientation of the LC layer and generate an undesirable leakage light occurring from all the pixels that display a dark state. This leakage light reduces the contrast ratio of the LCD unit. In the present embodiment, a smaller number of step portions prevents the ununiformity of the LC layer, and prevents the leakage light to thereby improve contrast ratio of the LCD unit.

Although some of the TFT areas are shielded by a pile of two color filter layers, the shield pattern including the pile of two color filter layers for shielding the TFT areas include the R- and B-color filter layers without the G-color filter layer. The pile of R- and B-color filter layers provides a higher optical density to the shield section, and includes the R-color filter layer, which effectively prevents incidence of the external light into the TFT to thereby reduce the optical leakage current of the TFT. Thus, absence of the G-color filter layer does not cause a substantial problem in a LCD unit and thereby provides a relatively higher image quality, unless the LCD unit requires an extremely higher image quality.

Samples experimentally manufactured for the color filter described in the eighth embodiment exhibited optical densities tabulated in Table 1 for the case wherein the R-, G- and B-color filter layers were around 1.5 μm thick and the range of chromaticity is at a NTSC ratio of around 60%. FIG. 4 shows the spectral transmission spectrum of the color filter layers in those samples of the color filter. In Table 1, optical densities are shown for the first through fifth samples of the eighth embodiment and for the sixth sample shown as a reference example. These samples were manufactured using the mask used in the first embodiment, to consecutively form G- R- and B-color filter layers in the color filter.

TABLE 1

| Sample No. | Embodiment | Structure; and Location of Shield section | Optical density |
|---|---|---|---|
| 1 | Eighth Embo. | G- and R-color filter layers; Gate line for R-color area | 1.30 |
| 2 | Eighth Embo. | G- and B-color filter layers; Gate line for G-color area | 1.02 |
| 3 | Eighth Embo. | R- and B-color filter layers; Gate line and TFT area for B-color area | 2.01 |
| 4 | Eighth Embo. | G-, R- and B-color filter layers; TFT are for R-color area | 2.02 |
| 5 | Eighth Embo. | G-, R- and B-color filter layers; TFT are for G-color area | 2.05 |
| 6 | Reference Ex. | G-, R- and B-color filter layers; TFT area for B-color area | 1.86 |

Comparing the third sample against the sixth sample, it is understood that the shield section that shields the gate lines or TFT area has an optical density of around 2 irrespective of presence or absence of the first-layer (G) color film pattern. Thus, it is understood that the present embodiment allows omission of the first-layer color filter pattern to to result in a minimum reduction of the optical density.

In the eighth exemplary embodiment, the light shield member includes the third shield section that shields the TFT area for the B-color pixel, extends directly from the stripe pattern, includes a pile of R- and B-color filter layers, and thus includes one layer less than the layers of second shield section that shields the TFT area for the R- and G-color pixels. Thus, the step difference in the TFT area in the B-color pixel is smaller than that of the TFT area for the R- and G-color pixels. As described before, the change of chromaticity that the human eye senses is higher for the B-color compared to that for R- and G-colors, thereby providing a larger influence compared to the change of R- and G-colors. The present embodiment reduces the step difference in the B-color area to prevent the image defect caused by the change of chromaticity of B-color area, thereby more effectively improving the image uniformity than the case of reducing the step difference in the R- or G-color area. Thus, the present embodiment effectively improves the image quality of the LCD unit.

The eighth exemplary embodiment maintains a relatively higher shield function of the light shield member, an prevents peel-off or partial removal of the color pattern caused by cleaning or developing during the fabrication process of the CF substrate, thereby further improving the product yield and image uniformity of the LCD unit.

In the eighth exemplary embodiment as described above, the first-layer color filter pattern includes a single extension pattern extending from the stripe pattern in the direction opposite to the direction toward the TFT area. However, the present embodiment may include the case that the first-layer color filter pattern includes a smaller-size extension pattern that extends from the stripe pattern toward the TFT area so long as the smaller-size extension pattern does not shield the TFT area itself. In this case, probability of peel-off or partial removal of the color filter layer can be reduced to improve the product yield of the LCD unit.

Ninth Exemplary Embodiment

FIGS. 39A to 39C and FIGS. 40A to 40C show the ninth embodiment similarly to FIGS. 37A to 37C and FIGS. 38A to 38C, respectively. The present embodiment is similar to the first embodiment except for the structure of the G-color pattern and B-color pattern. The G-color pattern formed from a first-layer color filter layer includes a stripe pattern and no extension pattern, whereas the B-color pattern formed from a third-layer color filter layer includes a stripe pattern and a pair of extension patterns having the same size. The R-color pattern is similar to that in the first embodiment.

The light shield member manufactured by the process shown in those drawings includes a first shield section that includes a pile of R- and B-color patterns and shields the gate lines, a second shield section that includes a pile of G-, R- and B-color patterns and shields the TFT area for the G-color area, and a third shield section that includes a pile of R- and B-color patterns and shields the TFT area for R- and B-color areas.

In the above configuration, the G-color pattern formed from the first-layer color filter layer includes a stripe pattern extending in the column direction and no stripe pattern extending from the stripe pattern in the row direction, one of the R- and B-color patterns formed from the second and third-layer color filter layers includes a stripe pattern and a pair of extension patterns having different sizes, and the other of them includes a stripe pattern and a pair of extension patterns having the same size. This structure improves the product yield of the LCD unit as described hereinafter.

In the ninth exemplary embodiment, the G-color pattern in contact with the glass substrate is less liable to peel-off or partial removal thereof due to the absence of extension pattern, even if a higher pressure of the cleaning water or larger strength of the ultrasonic wave is used during removing foreign particles from the CF substrate.

The shield section that shields the TFT area for the G-color area is configured by a pile of R- and B-color patterns which is formed directly on the glass substrate without an intervention of the G-color pattern. This structure provides a higher image quality as discussed with respect to the eighth exemplary embodiment.

The order of forming the R- and B-color patterns may be reversed from the above embodiment. More specifically, the R- and B-color patterns may be formed from the third- and second-layer color filter layers, respectively.

The ninth exemplary embodiment also provides a suitable light shield function, and prevents peel-off or partial removal of the color filter pattern to improve the product yield of the LCD unit.

The present invention can be applied, in addition to a LCD unit, field-emission display unit, fluorescent display unit, plasma display unit, and image pickup unit.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A method for manufacturing a color filter substrate for use in combination with a thin-film-transistor substrate that includes an array of pixels and associated thin film transistors disposed in a vicinity of intersections of gate lines and signal lines, said pixels each including an effective opening area and a shielded area encircling said effective opening area, said method comprising in a sequential order:

forming a plurality of first color filter layers with a spacing formed in an extending direction of said gate lines between each of the plurality of first color filter layers, the color filter layers including a first stripe portion extending in a direction parallel to said signal lines, and a pair of extension portions extending from said first stripe portion in opposite directions parallel to said gate lines;

forming a plurality of second color filter layers including a second stripe portion extending in a direction parallel to said signal lines, and a pair of second extension portions extending from said second stripe portion in opposite directions parallel to said gate lines adjacent to each said first color filter layer so that said second stripe portion is in parallel to said first stripe portion, and said second stripe portion and said first stripe portion are partially stacked on each other; and forming a plurality of third color filter layers including a third stripe portion extending in a direction parallel to said signal lines, and a pair of third extension portions extending from said stripe portion in opposite directions parallel to said gate lines adjacent said first color filter layer and said second color filter layer so that said third stripe portion is in parallel to said first and second stripe portions, and said third stripe portion is partially stacked on said first and second stripe portions, wherein said first through third color filter layers have different colors, a first color-stacked light shield section including color filter layers with two different colors stacked on each other in a portion of an area corresponding to said light shielded area on said color filter substrate is formed due to said first through third stripe portions adjacent to each other that are stacked on each other, and a second color-stacked light shield section including color filter layers with three different colors stacked on each other in a portion of an area corresponding to said light shielded area on said color filter substrate is formed due to said first through third color filter layers that are formed such that said pair of first through third extension portions are extended on a line parallel to an extending direction of said gate lines.

2. The method according to claim 1, wherein said first color filter layer is a blue-color filter layer, said second color filter layer is a red-color filter layer, and the third color filter layer is a green-color filter layer, or said first color filter layer is a red-color filter layer, said second color filter layer is a blue-color filter layer, and said third color filter layer is a green-color filter layer.

3. The method according to claim 1, wherein said second color-stacked light shield section faces said thin-film transistor disposed on said thin-film transistor substrate and a periphery of said thin-film transistor.

4. A method for manufacturing a color filter substrate for a liquid crystal display, said method comprising in a sequential order:

forming a plurality of first color filter layers with a spacing formed in an extending direction of gate lines between each of the plurality of first color filter layers, the color filter layers including a first stripe portion extending in a direction parallel to signal lines, and a pair of extension portions extending from said first stripe portion in opposite directions parallel to said gate lines;

forming a plurality of second color filter layers including a second stripe portion extending in a direction parallel to said signal lines, and a pair of second extension portions extending from said second stripe portion in opposite directions parallel to said gate lines adjacent to each said first color filter layer so that said second stripe portion is in parallel to said first stripe portion, and said second stripe portion and said first stripe portion are partially stacked on each other; and forming a plurality of third color filter layers including a third stripe portion extending in a direction parallel to said signal lines, and a pair of third extension portions extending from said stripe portion in opposite directions parallel to said gate lines adjacent said first color filter layer and said second color filter layer so that said third stripe portion is in parallel to said first and second stripe portions, and said third stripe portion is partially stacked on said first and second stripe portions, wherein said first through third color filter layers have different colors, a first color-stacked light shield section including color filter layers with two different colors stacked on each other in a portion of an area corresponding to a light shielded area on said color filter substrate is formed due to said first through third stripe portions adjacent to each other that are stacked on each other, and a second color-stacked light shield section including color filter layers with three different colors stacked on each other in a portion of an area corresponding to said light shielded area on said color filter substrate is formed due to said first through third color filter layers that are formed such that said pair of first through third extension portions are extended on a line parallel to an extending direction of said gate lines.

5. The method according to claim 4, wherein said first color filter layer is a blue-color filter layer, said second color filter layer is a red-color filter layer, and the third color filter layer is a green-color filter layer, or said first color filter layer is a red-color filter layer, said second color filter layer is a blue-color filter layer, and said third color filter layer is a green-color filter layer.

6. The method according to claim 4, wherein said second color-stacked light shield section faces a thin-film transistor disposed on a thin-film transistor substrate and a periphery of said thin-film transistor.

* * * * *